(12) United States Patent
Le et al.

(10) Patent No.: US 12,334,123 B2
(45) Date of Patent: Jun. 17, 2025

(54) SPIN-ORBIT TORQUE SOT READER WITH RECESSED SPIN HALL EFFECT LAYER

(71) Applicant: Western Digital Technologies, Inc., San Jose, CA (US)

(72) Inventors: Quang Le, San Jose, CA (US); Xiaoyong Liu, San Jose, CA (US); Fan Tuo, Fujisawa (JP); Brian R. York, San Jose, CA (US); Cherngye Hwang, San Jose, CA (US); Hisashi Takano, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/368,220

(22) Filed: Sep. 14, 2023

(65) Prior Publication Data

US 2025/0095673 A1    Mar. 20, 2025

(51) Int. Cl.
*G11B 5/39* (2006.01)
*G11B 5/37* (2006.01)

(52) U.S. Cl.
CPC ............ *G11B 5/3983* (2013.01); *G11B 5/374* (2013.01); *G11B 5/3912* (2013.01); *G11B 5/3954* (2013.01); *G11B 5/398* (2013.01); *G11B 2005/3996* (2013.01)

(58) Field of Classification Search
None
See application file for complete search history.

(56) References Cited

U.S. PATENT DOCUMENTS

| 2015/0070800 A1* | 3/2015 | Dimitrov et al. ...... G11B 5/374 |
| | | 360/235.4 |
| 2021/0056988 A1* | 2/2021 | Chen et al. .............. G11B 5/37 |
| 2022/0013138 A1* | 1/2022 | Hwang et al. ........... G11B 5/39 |
| 2024/0144960 A1* | 5/2024 | Le et al. ............... G11B 5/3912 |
| 2024/0144965 A1* | 5/2024 | Le et al. .................. G11B 5/39 |

* cited by examiner

*Primary Examiner* — Craig A. Renner
(74) *Attorney, Agent, or Firm* — PATTERSON + SHERIDAN, LLP

(57) ABSTRACT

The present disclosure generally relates to a magnetic recording head comprising one or more spin-orbit torque (SOT) devices, the SOT devices each comprising a bismuth antimony (BiSb) layer. The magnetic recording head comprises a SOT device comprising a first shield extending to a media facing surface (MFS), a seed layer disposed over the first shield, the seed layer being disposed at the MFS, a free layer disposed on the seed layer, the free layer being disposed at the MFS, a bismuth antimony (BiSb) layer disposed over the free layer, the BiSb layer being recessed from the MFS, a second shield disposed over the BiSb layer, the second shield extending to the MFS, and a shield notch coupled to the second shield, the shield notch being disposed between the first shield and the second shield. The magnetic recording head may be a two-dimensional magnetic recording head comprising two SOT devices.

22 Claims, 11 Drawing Sheets

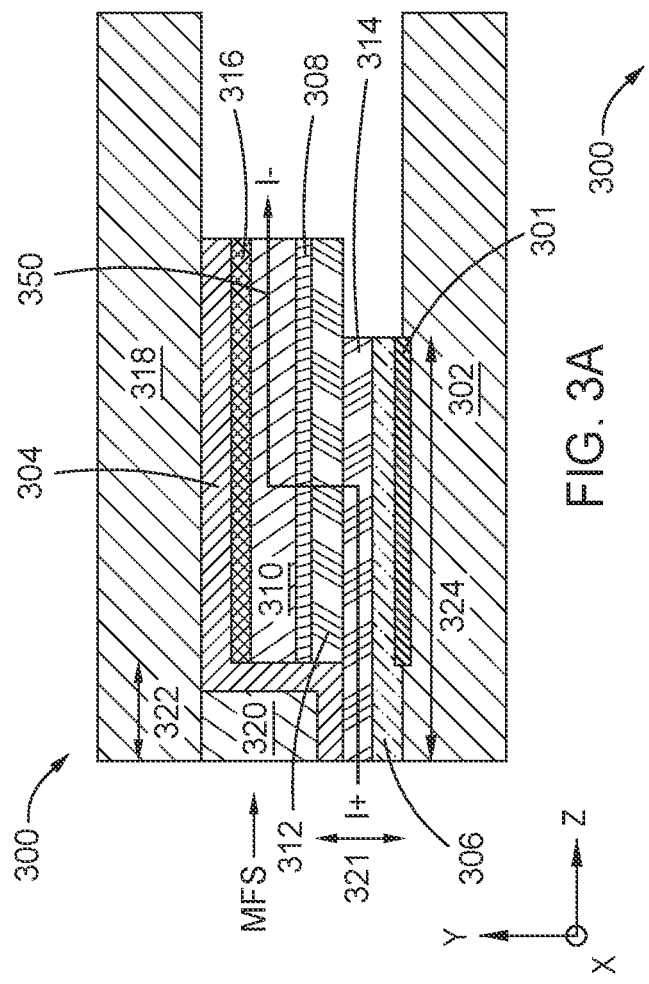
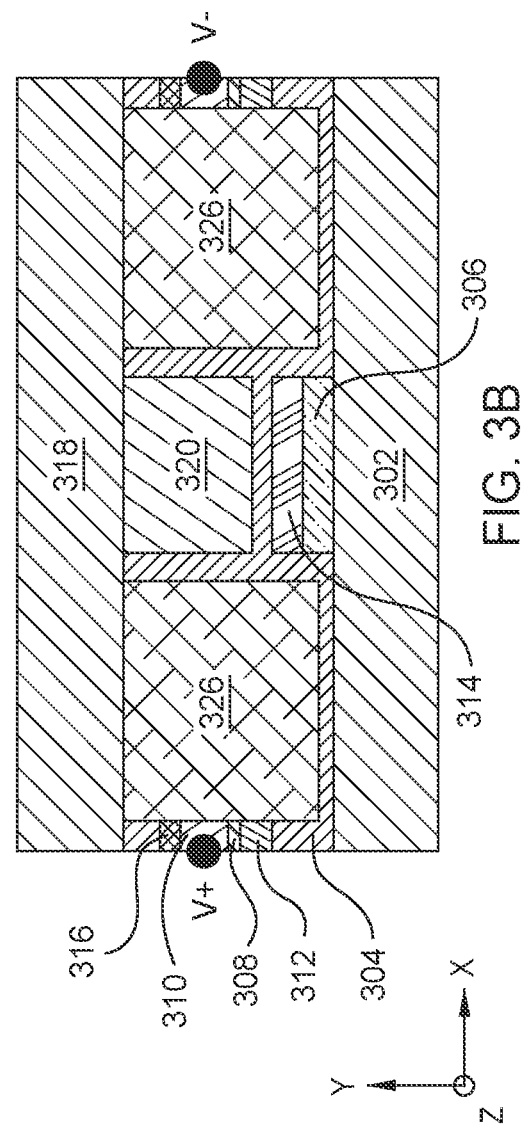
FIG. 3A
FIG. 3B

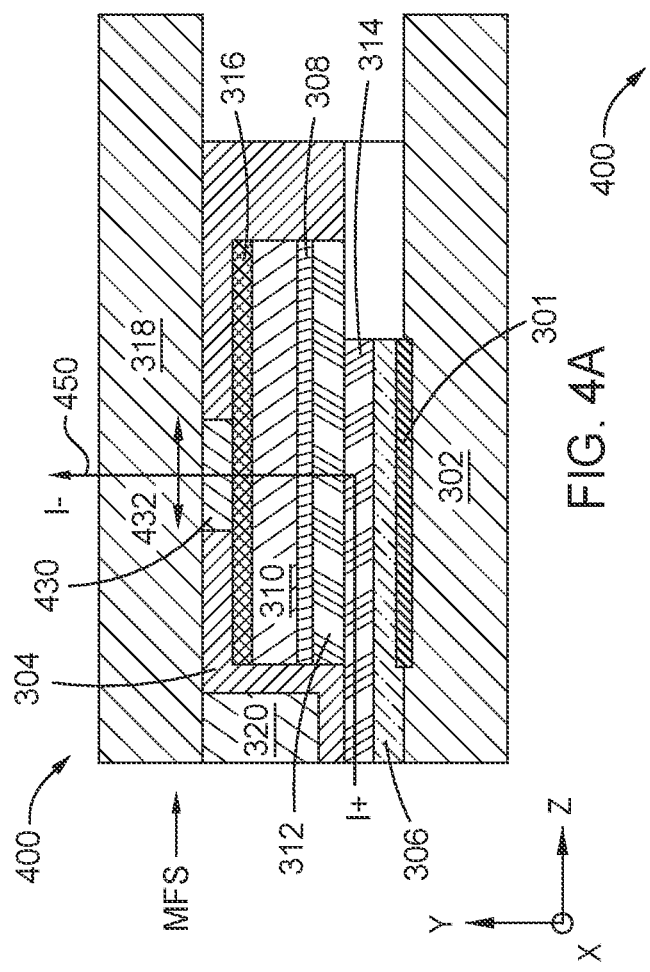
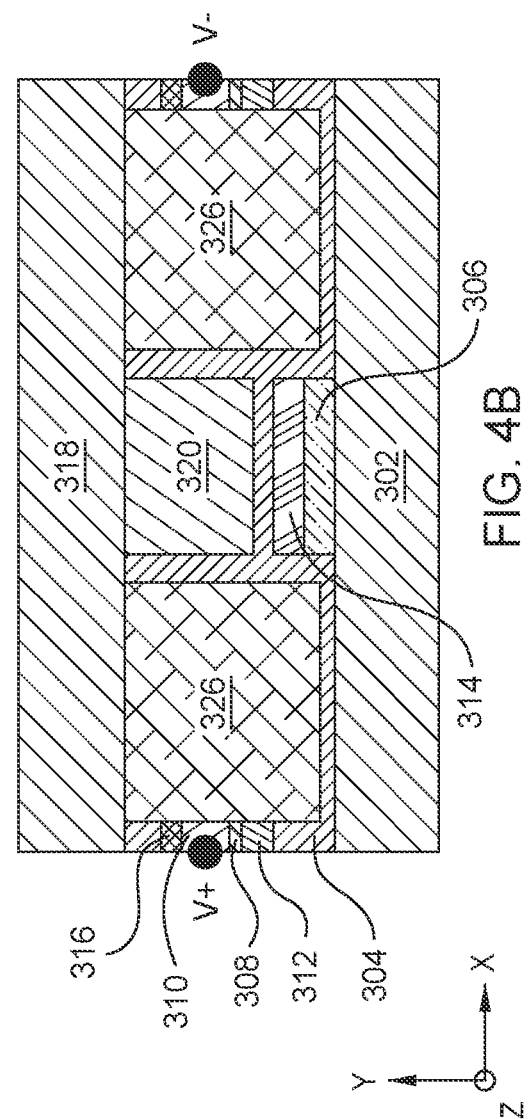

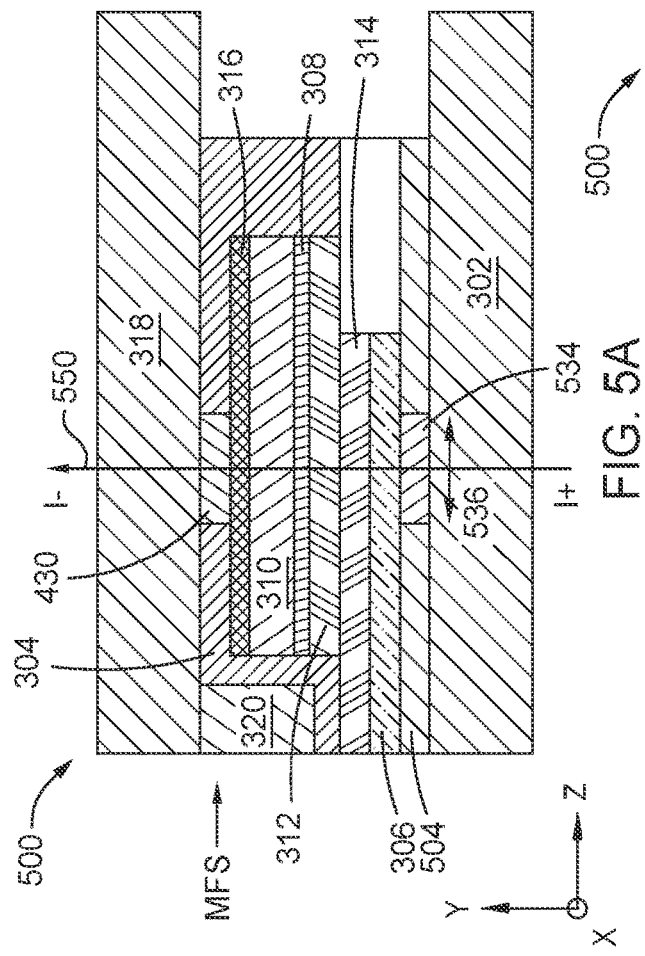
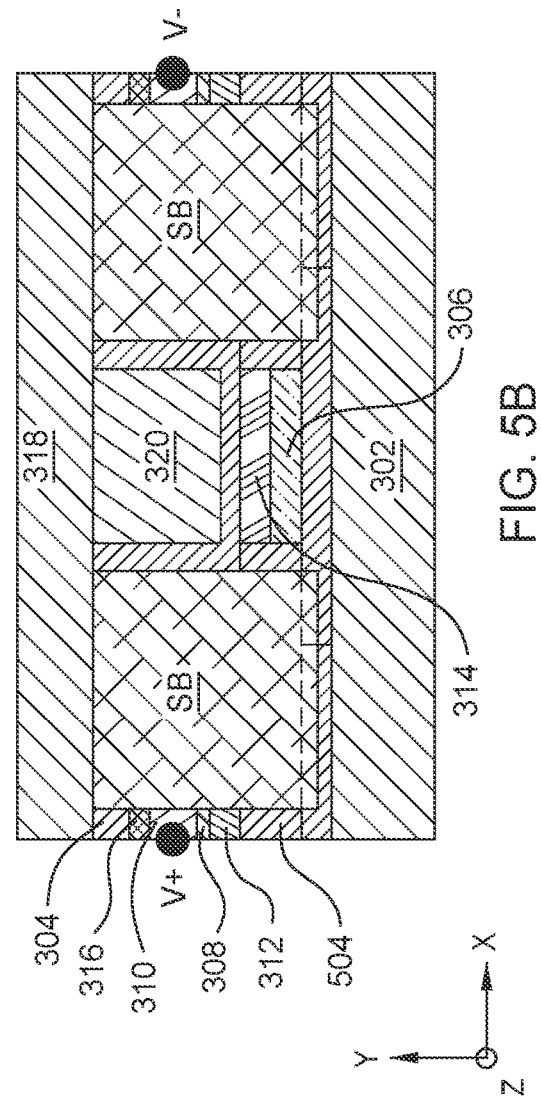
FIG. 5A
FIG. 5B

SPIN-ORBIT TORQUE SOT READER WITH RECESSED SPIN HALL EFFECT LAYER

BACKGROUND OF THE DISCLOSURE

Field of the Disclosure

Embodiments of the present disclosure generally relate to spin-orbit torque (SOT) device comprising a recessed spin Hall effect layer.

Description of the Related Art

BiSb layers are narrow band gap topological insulators with both giant spin Hall effect and high electrical conductivity. BiSb is a material that has been proposed in various spin-orbit torque (SOT) device applications, such as for a spin Hall layer for magnetoresistive random access memory (MRAM) devices, a hard disk drive (HDD) reader head with improved areal density, and energy-assisted magnetic recording (EAMR) write heads.

However, utilizing BiSb materials in commercial SOT applications can present several obstacles. For example, BiSb materials have low melting points, large grain sizes, significant Sb migration issues upon thermal annealing due to its film roughness, difficulty maintaining a desired (012) or (001) orientation for maximum spin Hall effect, and are generally soft and easily damaged during device processing step such as ion milling. For HDD reader devices utilizing BiSb, with the BiSb exposed at the media facing surface (MFS), the HDD reader device is even more prone to being damaged by oxidation or more thermal-mechanic stresses.

Therefore, there is a need for an improved SOT read device design utilizing BiSb layer(s) having a desired crystal orientation and a high signal-to-noise ratio.

SUMMARY OF THE DISCLOSURE

The present disclosure generally relates to a magnetic recording read head comprising one or more spin-orbit torque (SOT) devices, the SOT devices each comprising a bismuth antimony (BiSb) layer. The magnetic recording head comprises a SOT device comprising a first shield extending to a media facing surface (MFS), a seed layer disposed over the first shield, the seed layer being disposed at the MFS, a free layer disposed on the seed layer, the free layer being disposed at the MFS, a bismuth antimony (BiSb) layer disposed over the free layer, the BiSb layer being recessed from the MFS, a second shield disposed over the BiSb layer, the second shield extending to the MFS, and a shield notch coupled to the second shield, the shield notch being disposed between the first shield and the second shield. The magnetic recording head may be a two-dimensional magnetic recording head comprising two SOT devices.

In one embodiment, a magnetic recording head comprises a first shield extending to a media facing surface (MFS), a seed layer disposed over the first shield, the seed layer being disposed at the MFS, a free layer disposed on the seed layer, the free layer being disposed at the MFS, a bismuth antimony (BiSb)-comprising layer comprising BiSb disposed over the free layer, the BiSb-comprising layer being recessed from the MFS, a second shield disposed over the BiSb layer, the second shield extending to the MFS, and a shield notch coupled to the second shield, the shield notch being disposed between the BiSb-comprising layer and the MFS and between the first shield and the second shield.

In another embodiment, a magnetic recording head comprises a first shield extending to a media facing surface (MFS), a first free layer disposed over the first shield, the first free layer being disposed at the MFS, a first bismuth antimony (BiSb)-comprising layer comprising BiSb disposed over the first free layer, the first BiSb-comprising layer being recessed from the MFS, a second shield disposed over the first BiSb-comprising layer, the second shield extending to the MFS, a first shield notch coupled to the second shield, the first shield notch being disposed between the first BiSb-comprising layer and the MFS and between the first shield and the second shield, wherein the first BiSb-comprising layer is recessed from the MFS by the first shield notch, a third shield extending to the MFS, the third shield being disposed over the second shield, a second free layer disposed over the third shield, the second free layer being disposed at the MFS, a second BiSb-comprising layer comprising BiSb disposed over the second free layer, the second BiSb-comprising layer being recessed from the MFS, a fourth shield disposed over the second BiSb-comprising layer, the fourth shield extending to the MFS, and a second shield notch coupled to the fourth shield, the second shield notch being disposed between the second BiSb-comprising layer and the MFS and between the third shield and the fourth shield, wherein the second BiSb-comprising layer is recessed from the MFS by the second shield notch.

In yet another embodiment, a magnetic recording head comprises a first shield extending to a media facing surface (MFS), a first free layer disposed over the first shield, the first free layer being disposed at the MFS, a bismuth antimony (BiSb)-comprising layer comprising BiSb disposed over the first free layer, the first BiSb-comprising layer being recessed from the MFS, a second shield disposed over the first BiSb-comprising layer, the second shield extending to the MFS, a first shield notch coupled to the second shield, the first shield notch being disposed between the first BiSb-comprising layer and the MFS and between the first shield and the second shield, wherein the first BiSb-comprising layer is recessed from the MFS by the first shield notch, a second free layer disposed over the second shield, the second free layer being disposed at the MFS, a second BiSb-comprising layer comprising BiSb disposed over the second free layer, the second BiSb-comprising layer being recessed from the MFS, a third shield disposed over the second BiSb-comprising layer, the third shield extending to the MFS, and a second shield notch coupled to the third shield, the second shield notch being disposed between the second BiSb-comprising layer and the MFS and between the second shield and the third shield, wherein the second BiSb-comprising layer is recessed from the MFS by the second shield notch.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3B illustrate various views of a SOT device, according to one embodiment.

FIGS. 4A-4B illustrate various views of a SOT device, according to another embodiment.

FIGS. 5A-5B illustrate various views of a SOT device, according to yet another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
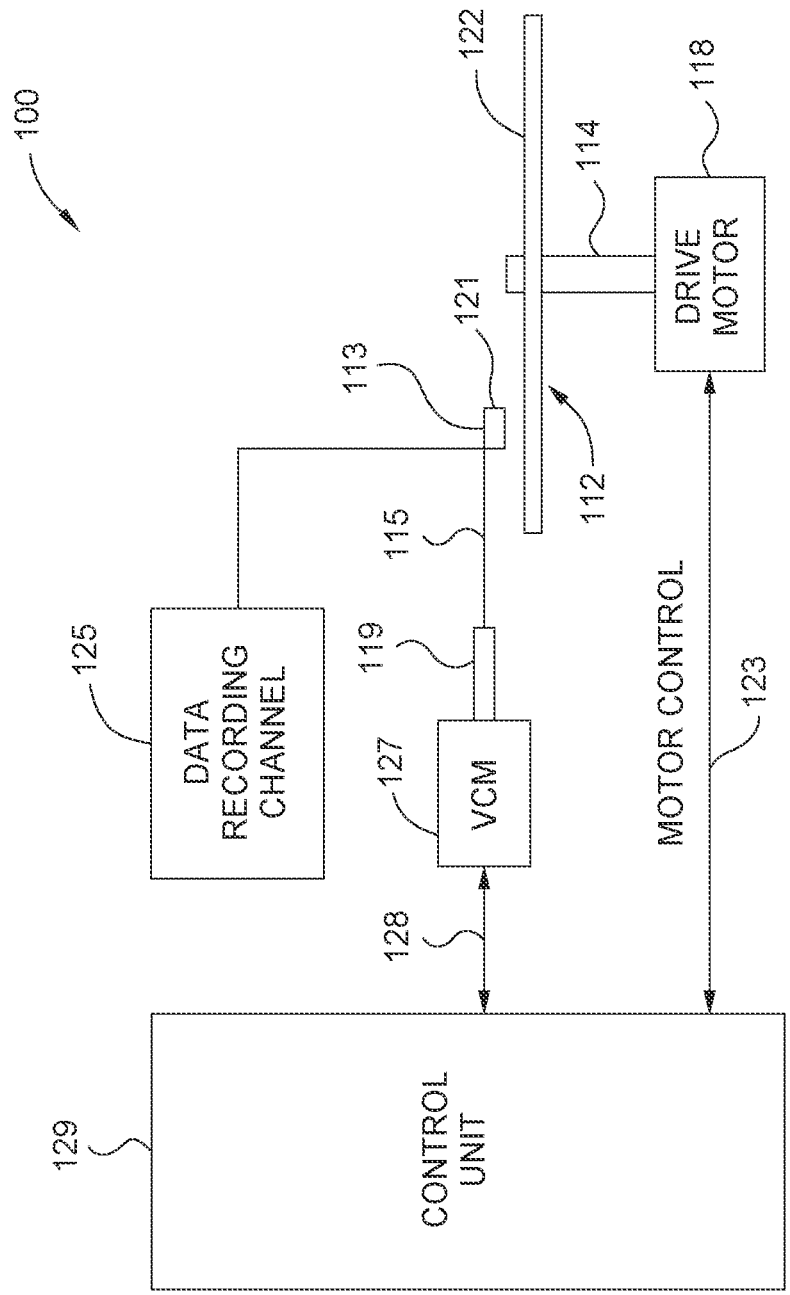
FIG. 1 is a schematic illustration of certain embodiments of a magnetic media drive including a magnetic recording head having a SOT device.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording head comprising one or more spin-orbit torque (SOT) devices, the SOT devices each comprising a bismuth antimony (BiSb) layer. The magnetic recording head comprises a SOT device comprising a first shield extending to a media facing surface (MFS), a seed layer disposed over the first shield, the seed layer being disposed at the MFS, a free layer disposed on the seed layer, the free layer being disposed at the MFS, a bismuth antimony (BiSb) layer disposed over the free layer, the BiSb layer being recessed from the MFS, a second shield disposed over the BiSb layer, the second shield extending to the MFS, and a shield notch coupled to the second shield, the shield notch being disposed between the first shield and the second shield. The magnetic recording head may be a two-dimensional magnetic recording head comprising two SOT devices.

A BiSb layer having a (012) orientation or a (001) orientation has a significant spin Hall angle and high electrical conductivity. Therefore, a BiSb layer having a (012) orientation or a (001) orientation can form a SOT device. For example, a BiSb layer having a (012) orientation or a (001) orientation can be used as a spin Hall layer in a spin-orbit torque device in a magnetic recording head, e.g., as part of a write head (MAMR). In another example, a BiSb layer having a (012) orientation or a (001) orientation can be used in nano oscillator devices for reading head applications where a signal is detected in the frequency domain. In another example, a BiSb layer having a (012) orientation or a (001) orientation can be used as a spin Hall electrode layer in an MRAM device. The SOT device can be in a perpendicular stack configuration or an in-plane stack configuration. The SOT device can be utilized in, for example, MAMR writing heads, read head, nano-oscillator based reader, MRAM, artificial intelligence chips, and other applications.

FIG. 1 is a schematic illustration of certain embodiments of a magnetic media drive 100 including a magnetic recording head having a SOT device. Such a magnetic media drive may be a single drive or comprise multiple drives. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

Figure 2:
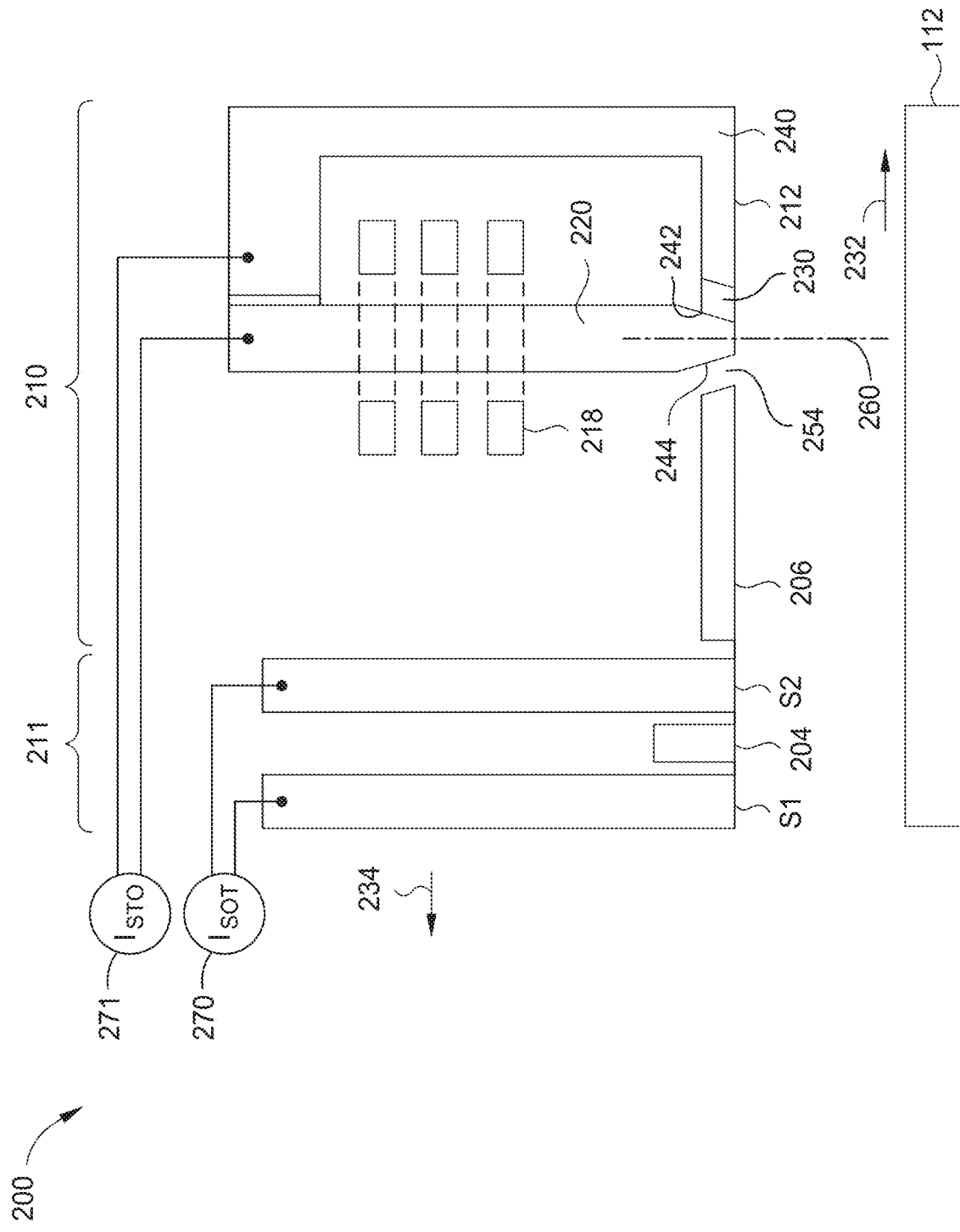
FIG. 2 is a fragmented, cross-sectional side view of certain embodiments of a read/write head having a SOT device.

At least one slider 113 is positioned near the magnetic disk 112, each slider 113 supporting one or more magnetic head assemblies 121 that include a SOT device. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 2 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders. It is to be understood that the embodiments discussed herein are applicable to a data storage device such as a hard disk drive (HDD) as well as a tape drive, such as those conforming to the LTO (Linear Tape Open) standards. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

FIG. 2 is a fragmented, cross-sectional side view of certain embodiments of a read/write head 200 having a SOT device. It is noted while an SOT device is shown in both the read head and write head, this is for illustrative purposes only, and an SOT device may be independently integrated into either only the read head or only the write head in various embodiments, or in both the read head and the write head. The read/write head 200 faces a magnetic media 112. The read/write head 200 may correspond to the magnetic head assembly 121 described in FIG. 1. The read/write head 200 includes a media facing surface (MFS) 212, such as a gas bearing surface, facing the disk 112, a write head 210, and a magnetic read head 211. As shown in FIG. 2, the magnetic media 112 moves past the write head 210 in the direction indicated by the arrow 232 and the read/write head 200 moves in the direction indicated by the arrow 234.

In some embodiments, the magnetic read head 211 is a SOT read head that includes an SOT sensing element 204 located between reader shields S1 and S2, where a first current source 270 is coupled to S1 and S2 via one or more lead connections to provide a current to the SOT sensing element 204. In some embodiments, a lead connection may be coupled to a shield within the SOT sensing device. Voltage detection leads (not shown) are within the SOT sensing element 204. The magnetic fields of the adjacent magnetized regions in the magnetic disk 112 are detectable by the SOT sensing element 204 as the recorded bits. In SOT sensing elements 204 comprising a BiSb layer, such as the SOT devices described in FIGS. 3A-6B, current flows perpendicular to the film plane, and the signal is read out by measuring the voltage in the BiSb layer generated by the inverse spin Hall effect. The SOT device of various embodiments can be incorporated into the read head 211.

The write head 210 includes a main pole 220, a leading shield 206, a trailing shield 240, and a coil 218 that excites the main pole 220, where a second current source 271 is coupled to the main pole 220 and the trailing shield 240. The coil 218 may have a "pancake" structure which winds around a back-contact between the main pole 220 and the trailing shield 240, instead of a "helical" structure shown in FIG. 2. In one embodiment, the write head 210 is a perpendicular magnetic recording (PMR) write head. In other embodiments, the write head 210 may use energy assisted magnetic recording (EAMR) technologies such as microwave assisted magnetic recording (MAMR) and heat assisted magnetic recording (HAMR).

In FIG. 2, optionally a spin orbital torque (SOT) device 230 is shown as part of the write head structure to enable a MAMR recording effect, in one embodiment. As noted above, while an SOT device is shown in FIG. 2 for both the read head and the write head, the SOT devices are not required to be implemented in both. For example, the write head may instead include other components to support HAMR in which case SOT device 230 may be absent. The SOT device 230 is formed in a gap 254 between the main pole 220 and the trailing shield 240. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy. In certain embodiments, the trailing shield 240 can include a trailing shield hot seed layer (not shown). The trailing shield hot seed layer can include a high moment sputter material, such as CoFe, CoFeNi, CoFex, Fex, or FeXN, where X includes at least one of Rh, Al, Ta, Zr, Co, Fe, N, and Ti. In certain embodiments, the trailing shield 240 does not include a trailing shield hot seed layer.

FIGS. 3A-8B illustrate various views of spin-orbit torque (SOT) devices 300, 400, 500, 600, 700, 800, according to various embodiments. Each SOT device 300, 400, 500, 600, 700, 800 may individually be used in the magnetic recording head of the drive 100 of FIG. 1 or other suitable magnetic media drives, such as the read head 211 and/or write head 210 of FIG. 2. The SOT devices 300, 400, 500, 600, 700, 800 may be referred to herein as read heads or readers. Aspects of the SOT devices 300, 400, 500, 600, 700, 800 may be used in combination with one another.

Furthermore, while the SOT devices 300, 400, 500, 600, 700, 800 are referred to as SOT devices, the SOT devices 300, 400, 500, 600, 700, 800 may function as spin torque oscillator (STO) devices. In some embodiments, when the SOT devices 300, 400, 500, 600, 700, 800 are used in a write head, the current flows in-plane to the SOT layer or bismuth antimony (BiSb) layer 310, and the ferromagnetic (FM) 312 or free layer 314 is oscillated by the SOT generated by the spin Hall effect in the BiSb layer 310.

FIGS. 3A-3B illustrate various views of a SOT device 300, according to one embodiment. FIG. 3A illustrates a cross-sectional or APEX view of the SOT device 300, and FIG. 3B illustrates a media facing surface (MFS) view of the SOT device 300.

The SOT device 300 comprises a first shield (S1) 302, a seed layer 306 disposed on the first shield 302, a free layer 314 disposed on the seed layer 306, a ferromagnetic (FM) layer 312 disposed on the free layer 314, an interlayer 308 disposed on the FM layer 312, a spin Hall effect (SHE) layer or BiSb layer 310 (which may also be referred to herein as a topological insulator (TI) layer) disposed on the interlayer 308, a cap layer 316 disposed on the BiSb layer 310, an insulation layer 304 disposed over the cap layer 316, and a second shield (S2) 318 disposed on the insulation layer 304. The FM layer 312 is optional, and may be a part of the free layer 314. The second shield 318 further comprises a S2 notch 320 disposed at the MFS. The insulation layer 304 is disposed between the S2 notch 320 and the free layer 314 at the MFS, and is further disposed behind the S2 notch 320 recessed from the MFS, such that the insulation layer 304 has a Z-like shape. An insulation layer 301 is disposed in contact with the S1 302 and the seed layer 306, recessed from the MFS, to help direct current towards the MFS during operation. The S2 notch 320 has a thickness in the y-direction of about 1 nm to about 5 nm. The SOT device 300 may comprise additional layers not shown, such as a buffer layer and/or a barrier layer.

In the SOT device 300, the FM layer 312, the interlayer 308, the SHE layer 310, and the cap layer 316 are recessed from the MFS by a portion of the insulation layer 304 and the S2 notch 320. The free layer 314 and the seed layer 306 are disposed at the MFS. The FM layer 312, the interlayer 308, the SHE layer 310, and the cap layer 316 are recessed from the MFS a distance 322 in the z-direction of about 5 nm to about 20 nm. The free layer 314 and the seed layer 306 each individually has a stripe height 324 in the z-direction of about 10 nm to about 30 nm. The distance 322 where the FM layer 312, the interlayer 308, the SHE layer 310, and the cap layer 316 are recessed from the MFS is less than the stripe height 324. The FM layer 312, the interlayer 308, the SHE layer 310, and the cap layer 316 may also have a stripe height in the z-direction of about 10 nm to about 100 nm.

Furthermore, due to the S2 notch 320, the shield-to-shield spacing of the SOT device 300 is reduced at the MFS, which narrows the read gap. The shield-to-shield spacing is the distance 321 from the first shield 302 to the S2 notch 320 at the MFS, which includes the free layer 314, the seed layer 306, and the portion of the insulation layer 304 disposed at the MFS. The distance 321 is about 5 nm to about 20 nm.

The SHE layer 310 comprises BiSb, and may be referred to as a BiSb layer 310, a SOT layer 310, and/or a topological insulator (TI) layer 310. The BiSb layer 310 may have a thickness in the y-direction of about 50 Å to about 200 Å. The BiSb layer 310 may comprise undoped BiSb or doped BiSbX, where the dopant is less than about at. 10%, and where X is extracted from elements which don't readily interact with either Bi or Sb, such as Cu, Ag, Ge, Mn, Ni, Co Mo, W, Sn, B, N, In, Te, Se, Y, Pt, Ti, N, or in alloy combinations with one or more of aforementioned elements, like CuAg, CuNi, CoCu, AgSn. The BiSb layer 310 may have a (012) crystal orientation or a (001) crystal orientation. The BiSb layer 310 may have a width in the z-direction that is greater than a width of the free layer 314.

The cap layer 316 may comprise nonmagnetic, high resistivity materials, such as: thin ceramic oxides or nitrides of TiN, SiN, MgTiO, and MgO; amorphous/nanocrystalline metals such as NifeGe, NiFeTa, NiTa, NiHf, NiFeHf, CoHf, CoFeHf, NiWTa, NiFeW, NiW, WRe, beta-Ta, and beta-W; or nitrides, oxides, or borides of above-mentioned elements, compounds, and/or alloys such as NiTaN, NiFeTaN, NiWTaN, NiWN, WReN, TaN, WN, TaOx, WOx, WB, HfB, NiHfB, NiFeHfB, CoHfB, and CoFeHfB, where x is a numeral greater than 1. In some embodiments, lower atomic number (Z) materials are preferred in the cap layer 316 to reduce sputter intermixing with the FM layer 312, but high Z alloys can be used, if used in combination with a migration barrier beneath, or if the high Z elements are used with a high resistive oxide, nitride, or boride. The cap layer 316 can comprise multilayer combinations of the above-mentioned materials, and the overall thickness of the cap layer 316 in the y-direction is less than or equal to about 100 Å (nominally about 15 Å to about 50 Å).

The FM layer 312, which may serve as a part of the free layer 314, has a thickness of about 5 Å to about 15 Å in the y-direction, and may comprise NiFe, CoFe, NiFeX, CoFeX, FeX, or Nix, where X=Co, Ni, Cu, Si, Al, Mn, Ge, Ta, Hf, and B. The FM layer 312 may comprise any magnetic layer combination or alloy combination of these elements that can yield a low coercivity, negative magnetostrictive FM layer 312, or in multilayer combinations with other higher polarizing materials like Heusler alloys or high Ni containing alloy FM layers.

The free layer 314 may comprise CoFeB, Co, CoFe, NiFe, or a similar material as the FM layer 312. The insulation layer 304 comprises an insulating material like SiN, or an oxide like $SiO_2$, AlOx, and MgO, where x is a numeral greater than 1, and can be used in combination with a Heusler alloy layer, and is adjacent to the BiSb layer to maintain texture and control Bi and Sb interdiffusion. The first and second shields 302, 318 and the S2 notch 320 may individually comprise a magnetic permeable and electrically conductive material selected from the group consisting of NiFe, CoFe, NiFeCo, alloys, and their combination, NiFe, NiFeCr, or other soft magnetic materials.

Each of the seed layer 306 and the interlayer 308 comprises magnetic or nonmagnetic Heusler alloys, where the Heusler alloys may be full Heusler alloys (i.e., $X_2YZ$) or half Heusler alloys (i.e., XYZ). Full $X_2YZ$ type Heusler alloys generally have L21, cF16, or C1b type structures with an a-axis between about 5.70 Å and about 6.20 Å. Half XYZ type Heusler alloys generally have a B2 type or Pm-3m type structure with a-axis between about 2.85 Å to about 3.10 Å. However, the type or structure may vary with respect to both half and full Heusler alloys. For instance, RuMnAl, RhMnAl, and $Al_2CuRh$, have a Pm-3m structure, and $Ni_2MnAl$ and $Mn_2NiAl$ have cF16 structures while $Al_2NiMn$ has a B2 structure.

With both full and half Heusler alloys, X may be one of Li, Mg, Mn, Fe, Co, Ni, Cu, Ru, Rh, Pd, Ag, Cd, Ir, Pt, or Au; Y may be one of Li, Be, Sc, Ti, V, Cr, Mn, Fe, Co, Ni, Zn, Y, Zr, Nb, Mo, Hf, or W; and Z may be one of B, Mg, Al, Si, Zn, Ga, Ge, As, In, Sn, Sb, Pb, or Bi. Some nonmagnetic Heusler alloy examples include $Ti_2MnAl$, $Fe_2VAl$ (a-axis=5.78 Å), $Cr_2CoAl$ (a-axis=5.88 Å), CoTiSb (a-axis=5.88 Å), $Mn_2VSi$, $V_2VAl$ (a-axis=6.14 Å), $[Mn_{1-x}Co_x]_2VAl$ (x=0.5) (a-axis=6.05 Å), $[Mn_{1-x}Co_x]_2VSi$ (x=0.25) (a-axis=6.18 Å), and CoMnNbAl, CoZrFeAl. Magnetic Heusler alloy examples having large spin polarizations include $Co_2MnSb$ (a-axis=5.94 Å), $Co_2MnGe$ (a-axis=5.75 Å), CoMnSb (a-axis=5.90 Å) NiMnSb, $Co_2FeGe$, $Co_2MnSn$, and $Co_2MnFeGe$, each of which does not readily mix with the BiSb layer 310.

Moreover, in some embodiments, each of seed layer 306 and the interlayer 308 comprises: (1) amorphous/nanocrystalline layers formed from Heusler alloys in combination with elements, or alloy layers that don't readily mix with the SOT or FM layers, or uniform alloys formed by co-sputtering Heusler alloys with other elements, or alloys which don't readily intermix with SOT or FM layer, or (2) polycrystalline Heusler alloys, which are epitaxial layers in the SOT device 300. With respect to (1), amorphous/nanocrystalline layer options for the seed layer 306 and/or interlayer 308, thin polycrystalline Heusler alloys (both magnetic and nonmagnetic, and full or half Heusler alloys) can be used when alloyed with other elements that don't readily mix with the BiSb layer 310, such as Cu, Ag, Ge, Mn, Ni, Co Mo, W, Sn, B, Te, Se, Y, Pt, Ti, N, and In, or in alloy combinations with one or more of aforementioned elements, such as CuAg, CuNi, CoCu, AgSn.

With respect to (2), polycrystalline Heusler alloys, thin layers of Heusler alloys, both magnetic and nonmagnetic, full or half Heusler alloys, can be used as the seed layer 306 and/or the interlayer 308 in (100) textured layer SOT devices (SOT orientation in this scenario is (012)). Heusler alloys generally have higher resistivities then the FM layer 312, and transport spin currents or yield high spin polarization, while providing and maintaining (100) growth.

Other non-Heusler, nonmagnetic materials that could be used for one or more of the epitaxial seed layer 306 and/or the interlayer 308 for epitaxial growth are: B2 or bcc materials, such as AlX, where X=V, Mn, Fe, Co, Ni, Ru, Rh, and Nobel metals Re, Os, Ir, Pt, Au, and Pd or in alloy combinations thereof; CrMo, where Mo is between about at. 20% to about 50%, CrMoTi, Cr, MoV, CrMoW; or CrXY, where X and Y are each individually selected from the group consisting of: Al, Ti, Mn, Co, Ni, Ru, Mo, Rh, W, and V.

In some embodiments, the seed layer 306 and/or the interlayer 308 can each be formed from thin ceramic oxide or nitride layers like TiN, WN, SiN, and $Al_2O_3$, and MgO in combination with other high resistive nonmagnetic material layers. The top portion of a multilayer interlayer 308 may also be comprise of heavier high resistivity metal amorphous or amorphous/nanocrystalline metals like NiFeTa, NiTa, NiHf, NiFeHf, CoHf, CoFeHf, NiWTa, NiFeW, NiW, and WRe; nanocrystalline metals like beta-Ta and beta-W; or nitrides, oxides, or borides of the aforementioned elements or alloys like NiTaN, NiFeTaN, NiWTaN, NiWN, WREN, TaN, WN, TaOx, WOx, TaBx, WBx, HfBx, NiHfB, NiFeHfB, and CoHfB, where x is a numeral greater than 1.

The bottom portion of the interlayer 308 can be an amorphous/nanocrystalline material formed from Heusler alloys or other magnetic alloy materials when combined with aforementioned non-interacting elements or alloy combinations of those elements. Higher resistivity nonmagnetic alloys which do not interact with the FM layer 312, such as CuAg, CuNi, NiAg, CoCu, NiAl, RuAl, RhAl, and AgSn, can also be used for the interlayer 308. The interlayer 308 can also be a polycrystalline nonmagnetic Heusler alloy or half Heusler alloy, or other B2 or bcc materials, such as AlX, where X=V, Mn, Fe, Co, Ni, Ru, Rh, and Nobel metals Re, Os, Ir, Pt, Au, and Pd or in alloy combinations thereof; CrMo, where Mo is between about at. 20% to about 50%, CrMoTi, Cr, MoV, CrMoW; or CrXY, where X and Y are each individually selected from the group consisting of: Al, Ti, Mn, Co, Ni, Ru, Mo, Rh, W, and V; or in any combination of these material layers which has a higher resistive non-interacting layer next to the FM layer 312, among others.

When alloyed with nonmagnetic materials that do not readily intermix with FM layer 312, examples of high resistive amorphous materials for the interlayer 308 include: (1) Ge/CoFe/CuAg (as used here "/" denotes separate sub-layers in a stack or layer) (where Ge/CoFe may form a single layer at room temperature or may be deposited as an alloy layer, and where Ge has a thickness of about 6 Å, CoFe has a thickness of about 4 Å, and CuAg has a thickness of about 3 Å), (2) CuAg/Ge/CoFe/CuAg (where CuAg/Ge/CoFe may form a single layer at room temperature or may be deposited as an alloy layer, and where CuGe has a thickness of about 3 Å, Ge has a thickness of about 5 Å, CoFe has a thickness of about 4 Å, and CuAg has a thickness of about 2 Å), and (3) thin nonmagnetic alloy layers like CoFeGe, NiFeGe, CoFeGeAg, etc. (alloy composition for alloys with Ge should be greater than about 44 at. % Ge to render the alloy nonmagnetic).

When alloyed with nonmagnetic materials that do not readily intermix with FM layer 312, additional examples of elements, compounds, or crystalline/amorphous/nanocrystalline materials that may be utilized as the interlayer 308 include: (1) Ge/CoFe/NiFeTaN (where Ge/CoFe may form a single layer at room temperature or may be deposited as an alloy layer, and where Ge has a thickness of about 6 Å, CoFe has a thickness of about 4 Å, and NiFeTaN has a thickness of about 3 Å); (2) Ge/CoFe/MgO (where Ge/CoFe may form a single layer at room temperature or may be deposited as an alloy layer, and where Ge has a thickness of about 6 Å, CoFe has a thickness of about 4 Å, and MgO has a thickness of about 3 Å); and (3) MgO/Ge/CoFe (where Ge/CoFe may form a single layer at room temperature or may be deposited as an alloy layer, and where MgO has a thickness of about 3 Å, Ge has a thickness of about 6 Å, and CoFe has a thickness of about 4 Å).

Examples of an interlayer 308 using alloys with $X_2YZ$ Heusler alloys would be: (1) Ge/$Co_2$FeGe (which may form a single layer at room temperature or may be deposited as an alloy layer, and where Ge is about 4 Å thick and $Co_2$FeGe is about 5 Å thick); (2) using alloys with XYZ half Heusler alloys like Ge/CoFeGe (which may form a single layer at room temperature or may be deposited as an alloy layer, where Ge is about 3 Å thick and CoFeGe is about 6 Å thick); and (3a) Ge/CoA (which may form a single layer at room temperature or may be deposited as an alloy layer), (3b) Ge/FeA (which may form a single layer at room temperature or may be deposited as an alloy layer), or (3c) Ge/NiA (which may form a single layer at room temperature or may be deposited as an alloy layer), where A can be one or more elements belonging to full Heusler alloys $X_2YZ$ or half Heusler alloys XYZ; or used in combination with very thin (i.e., dusting layers about 1 Å to about 5 Å thick) of nonmagnetic seed or capping layers of alloys of CuAg, NiCr, CoCu, AgSn, etc., such as Ge/$X_2$YZ/CuAg, Ge/$X_2$YZ/CuNi, CuNi/Ge/$X_2$YZ, or CuAg/Ge/$X_2$YZ/CuNi. The alloy composition should be nonmagnetic as in the case of alloys with one of the aforementioned non-interacting elements or alloys of these elements like Ge where Ge exceeds about 44 at. % to render the alloy nonmagnetic.

Additionally, the interlayer 308 may comprise nonmagnetic alloy or multilayer stack containing one or more of the following elements Cu, Ag, Ge, Mn, Ni, Co, Mo, W, In, B, Te, Se, Y, Pt, Ti, N, and Sn; or in conjunction with magnetic alloys such as CoA, FeA, and NiA, where A can be one or more elements belonging to full Heusler alloys $X_2YZ$ or half Heusler alloys XYZ, where X is selected from the group consisting of: Mn, Fe, Co, Ni, Cu, Ru, Rh, Pd, Ag, Ir, Pt, and Au; where Y is selected from the group consisting of: Ti, V, Cr, Mn, Fe, Co, Ni, Zn, Y, Zr, Nb, Mo, Hf and W; and where Z is selected from the group consisting of: B, Al, Si, Ga, Ge, As, In, Sn, Sb, and Bi. In some embodiments, the magnetic alloys or Heusler alloys should combine with other layers, combinations of elements, or other alloys to form a nonmagnetic layer or multilayer stack after room temperature deposition and intermixing, or deposited as a nonmagnetic single layer alloy, or in combinations thereof. The overall total thickness of the interlayer 308 is less than about 20 Å, such as about 3 Å to about 15 Å to ensure adequate magnetic coupling of the FM layer 312 to the BiSb layer 310. Nonmagnetic polycrystalline Heusler alloys may also be used for the interlayer 308, such as $V_2$VAl or $[Mn_{0.5}Co_{0.5}]_2$VAl, etc.

In some embodiments, the interlayer 308 should have higher resistivity and be nonmagnetic. Thin, high resistivity, low Z ceramic oxide and nitride layers of TiN, SiN, $Al_2O_3$, MgO, thin layers can be used in the interlayer 308. Furthermore, other materials that may be used as the interlayer 308 if not disposed in direct contact with the BiSb layer 310 include: high resistivity, heavier metal amorphous/nanocrystalline metals such as NiFeTa, NiTa, NiWTa, NiFeW, NiW, and WRe; nanocrystalline metals like beta-Ta or beta-W; or nitrides, oxides, or borides of the aforementioned elements or alloys such as NiTaN, NiFeTaN, NiWTaN, NiWN, WReN, TaN, WN, TaOx, WOx, TaBx, WBx, and HfBx. Higher resistivity, nonmagnetic alloys which don't readily interact with the BiSb layer 310 or the FM layer 312 may also be used for the interlayer 308, such as Cu, Ag, Ge, Mn, Ni, Co Mo, W, Sn, B, In, and multi-element alloys combinations thereof, like CuAg, CuNi, NiAg, CoCu, NiAl, RuAl, RhAl, CuCo, and AgSn.

Examples of high resistive, amorphous materials for the interlayer 308 include Ge (6 Å)/CoFe (4 Å)/CuAg (3 Å) (which may form a single layer at room temperature or may be deposited as an alloy layer), CuAg (3 Å)/Ge (5 Å)/CoFe (3 Å)/CuAg (2 Å) (which may form a single layer at room temperature or may be deposited as an alloy layer), or single alloy nonmagnetic layers of CoFeGe, NiFeGe, CoFeGeAg, among others. The interlayer 308 may comprise thin multilayer stacks consisting of the aforementioned elements, compounds, or crystalline/amorphous/nanocrystalline layers as long as the overall multilayer stack is nonmagnetic and has a high resistivity.

Magnetic alloys and magnetic Heusler alloys can be used for the interlayer 308 if used in combinations with other elements or alloys above such that when deposited, the materials intermix at room temperature, or after post annealing, to form a nonmagnetic stack. Examples include layers of NiFeX, CoFeX, NiX, FeX, $Co_x$, where X is an element that does not readily interact with BiSb, such as Cu, Ag, Ge, Mn, Ni, Co, Mo, W, Sn, B, Te, Se, Y, Pt, Ti, N, and In, or magnetic Heusler alloys deposited on non-interacting element or alloy layers like Ge layers and in single alloy deposition layers where the resulting Ge content in the intermixed alloy renders it nonmagnetic (e.g., in the case of alloying with Ge the Ge content should be greater than or equal to about 44 at. %); or in combination with sufficiently thick layers of elements which do not readily interact with BiSb, such as Cu, Ag, Ge, Mn, Ni, Co, Mo, W, Sn, B, and In, to form multi-element, nonmagnetic, high resistivity combinations thereof; or single polycrystalline nonmagnetic Heusler layers.

Another example of materials that may be used for the interlayer 308 and/or the seed layer 306 include: Ge/CoFe/NiFeTaN (where Ge/CoFe may form a single layer at room temperature or may be deposited as an alloy layer, and where Ge has a thickness of about 6 Å, CoFe has a thickness of about 4 Å, and NiFeTaN has a thickness of about 3 Å).

The seed layer 306 may further comprise any of the above-listed materials used in the interlayer 308, such as a single alloy layer or layer combinations; nonmagnetic alloys or multilayer stacks comprising one or more of the following elements Cu, Ag, Ge, Mn, Ni, Mo, and W; or multi-element alloy combinations thereof; or in conjunction with magnetic and or nonmagnetic alloys such as CoA, FeA, NiA, where A is one or more elements belonging to full Heusler alloys $X_2YZ$ or half Heusler alloys XYZ, where X is selected from the group consisting of: Mn, Fe, Co, Ni, Cu, Ru, Rh, Pd, Ag, Ir, Pt, and Au; Y is selected from the group consisting of: Ti, V, Cr, Mn, Fe, Co, Ni, Zn, Y, Zr, Nb, Mo, Hf, and W; and Z is selected from the group consisting of: B, Al, Si, Ga, Ge, As, In, Sn, Sb, and Bi. In some embodiments, the magnetic alloy or Heusler alloys should combine with other elements such as Cu, Ag, Ge, Mn, Co, Ni, Mo, Sn, In, B, Te, Se, Y, Pt, Ti, N, and W, or combine in multi-elemental alloy layers thereof, to form a nonmagnetic total stack seed layer 306. The seed layer 306 may be thin or relatively thick, such as having a thickness in the y-direction of about 5 Å to about 100 Å. A thicker seed layer 306 can provide better migration resistance against elements from neighboring stacks getting into the BiSb layer 310, or provide better migration resistance of the Bi or the Sb migration out of the BiSb layer 310. The seed layer 306 can be made thicker by lamination of layers to better control SOT nucleation/growth and texture.

Additional examples of materials that can be used for the seed layer 306 include: [Ge/$X_2YZ$]*n laminations, [Ge/XYZ]*n laminations, and [Ge/XYZ]*n laminations, where n is a whole numeral; Ge-enriched $X_2YZ$ and Ge-enriched XYZ single layer alloys such that the seed layer 306 is nonmagnetic (i.e., Ge>44%); [Ge (6 Å)/$Co_2$(MnFe)Ge (4 Å)]*4, [Ge (3 Å)/CoFeGe (6 Å)]*3, and [Ge (6 Å)/NiFe (4 Å)]*n; and with Ge alloyed or layered with NiA, FeA, CoA in lamination, where A is one or more elements belonging to full Heusler alloys $X_2YZ$ or half Heusler alloys XYZ, for example, [Ge (6 Å)/NiA (4 Å)]*n] where 1<n<4. The overall seed layer 306 has a thickness between about 10 Å to about 50 Å.

As shown in FIG. 3B, soft bias (SB) side shields 326 are disposed on either side of the S2 notch 320, the free layer 314, and the insulation layer 304 at the MFS. The SB side shields 326 comprise a magnetic material, such as NiFe, CoFe, NiFeCo, CoFeHf, CoFeCr, or combinations thereof. The SB side shields 326 may be spaced from the free layer 314 and/or the S2 notch 320 by the insulation layer 304.

During operation, current (at the I+ lead) is applied or injected into a lead (not shown) of the S1 302 at the MFS, such as by the current source 270 of FIG. 2. The insulation layer 301 helps direct or keep the current confined near the MFS, where the current flows through the seed layer 306 to the free layer 314 at the MFS, and then flows away from the MFS in the z-direction. The current, which is spin-polarized when it comes out of the free layer 314, then flows up through the FM layer 312 and the interlayer 308 in the y-direction to the BiSb layer 310. The current then flows perpendicular in the z-direction through the BiSb layer 310, away from the MFS, to the back of the BiSb layer 310 as the current (at the I– lead) return path (shown by arrow 350 in FIG. 3A). While flowing within the BiSb layer 310, there will be transverse voltage induced by the spin current, due to an inverse spin Hall effect, which can be sensed or detected at the cross-track locations marked V+ and V–, shown in FIG. 3B. The current then continues flowing out towards a back of the SOT device 300. The S2 notch 320 and the insulation layer 304 disposed between the cap layer 316 and the second shield 318 each help to confine the current path to be a Z-like shape. Because the BiSb layer 310 is recessed from the MFS and the free layer 314 is exposed at the MFS, the BiSb layer 310 is protected from instability/corrosion due to chemical thermal/mechanical stress if exposed to the MFS and improves linear resolution.

FIGS. 4A-4B illustrate various views of a SOT device 400, according to another embodiment. FIG. 4A illustrates a cross-sectional or APEX view of the SOT device 400, and FIG. 4B illustrates an MFS view of the SOT device 400. The SOT device 400 of FIGS. 4A-4B is similar to the SOT device 300 of FIGS. 3A-3B; however, the SOT device 400 further comprises a second S2 notch or S2 via 430 disposed in contact with the second shield 318 and the cap layer 316. The S2 via 430 is recessed from the MFS by the S2 notch 320 and a portion of the insulating layer 304. The S2 via 430 may comprise the same material as the second shield 318 and/or the S2 notch 320. The width 432 of the S2 via 430 in the z-direction is about 5 nm to about 30 nm.

During operation, current (at the I+ lead) is applied or injected into a lead (not shown) of the S1 302 at the MFS, such as by the current source 270 of FIG. 2. The insulation layer 301 helps direct or keep the current confined near the MFS, where the current flows through the seed layer 306 to the free layer 314 at the MFS, and then flows away from the MFS in the z-direction. The current, which is spin-polarized when it comes out of the free layer 314, then flows perpendicularly up in the y-direction through the FM layer 312, the interlayer 308, the BiSb layer 310, the cap layer 316, the S2 via 430, and out through the second shield 318 as the current (at the I− lead) return path (shown by arrow 450 in FIG. 4A). The current then continues flowing out towards a back of the SOT device 400. While flowing within the BiSb layer 310, there will be transverse voltage induced by the spin current, due to an inverse spin Hall effect, which can be sensed or detected at the cross-track locations marked V+ and V−, shown in FIG. 4B. The S2 via 430 produces alternative perpendicular current path into the second shield (S2) 318 where a lead is provided to route the current back to the current source, and helps to confine the current path to in a vertical direction. Because the BiSb layer 310 is recessed from the MFS and the free layer 314 is exposed at the MFS, the BiSb layer 310 is protected from instability/corrosion due to chemical thermal/mechanical stress if exposed to the MFS and improves linear resolution.

FIGS. 5A-5B illustrate various views of a SOT device 500, according to yet another embodiment. FIG. 5A illustrates a cross-sectional or APEX view of the SOT device 500, and FIG. 5B illustrates an MFS view of the SOT device 500. The SOT device 500 of FIGS. 5A-5B is similar to the SOT device 400 of FIGS. 4A-4B; however, the SOT device 500 further comprises an S1 notch or S1 via 534 disposed in contact with the first shield 302 and the seed layer 306. The S1 via 534 is recessed from the MFS by a portion of the insulating layer 304. The S1 via 534 may comprise the same material as the first shield 302. The width 536 of the S1 via 534 in the z-direction is about 5 nm to about 30 nm. In some embodiments, the S1 via 534 and the S2 via 430 are aligned in the y-direction. An insulation layer 504 is disposed between the seed layer 306 and the first shield 302, and around the S1 via 534.

During operation, current (at the I+ lead) is applied or injected into the first shield 302, such as by the current source 270 of FIG. 2, and flows parallel to the MFS. The current then flows perpendicularly up in the y-direction through the S1 via 534, the seed layer 306, the free layer 314, the FM layer 312, the interlayer 308, the BiSb layer 310, the cap layer 316, the S2 via 430, and out through the second shield 318 as the current (at the I− lead) return path (shown by arrow 550 in FIG. 5A). In other words, the current flows vertically from the first shield 302 to the second shield 318. Each shield may have a lead that provides a path to the current source. The current then continues flowing out towards a back of the SOT device 500. While flowing within the BiSb layer 310, there will be transverse voltage induced by the spin current, due to an inverse spin Hall effect, which can be sensed or detected at the cross-track locations marked V+ and V−, shown in FIG. 5B. Because the BiSb layer 310 is recessed from the MFS and the free layer 314 is exposed at the MFS, the BiSb layer 310 is protected from instability/corrosion due to chemical thermal/mechanical stress if exposed to the MFS and improves linear resolution.

Figure 6A:
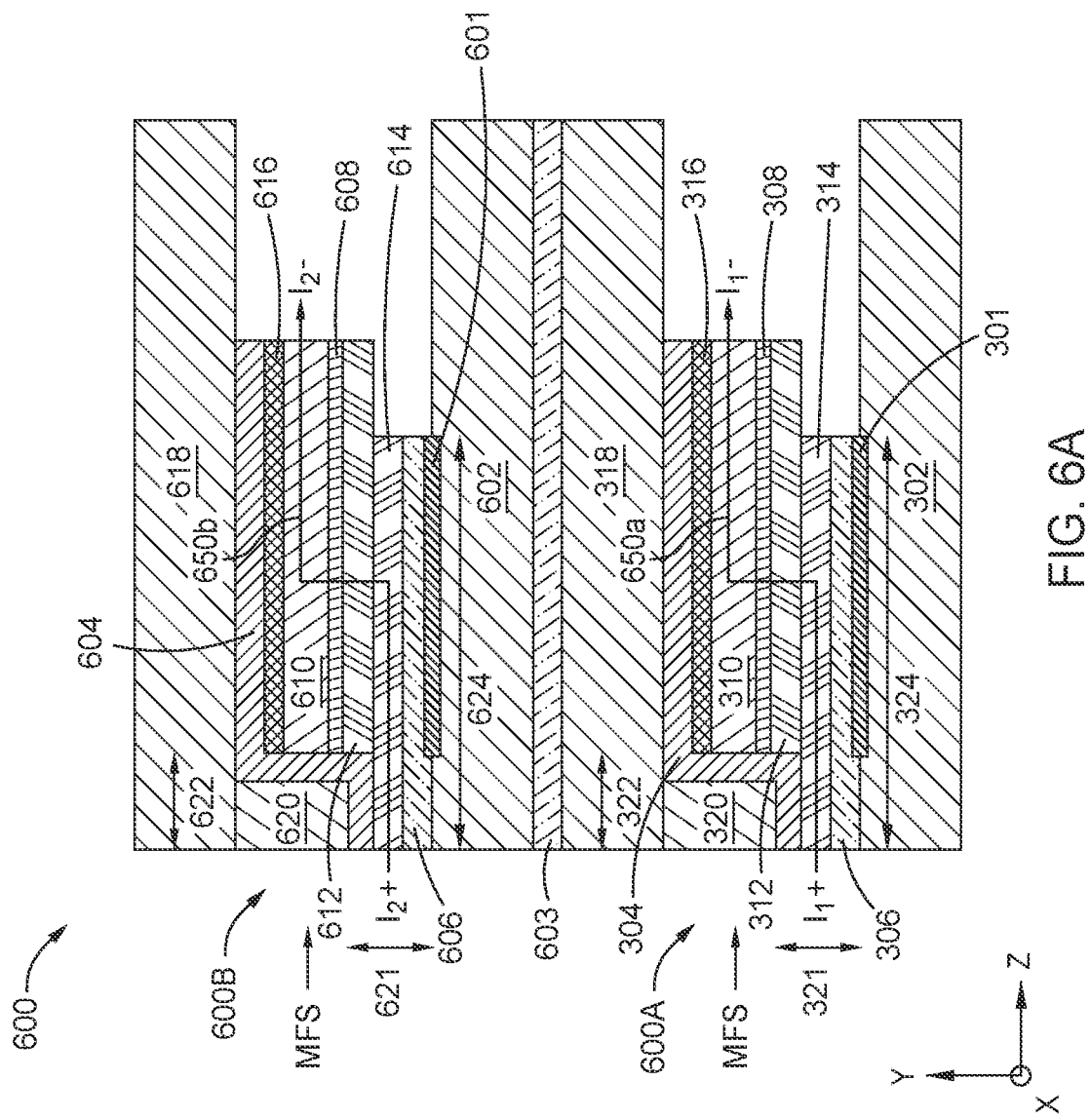
FIGS. 6A-6B illustrate various views of a TDMR SOT device, according to one embodiment.
Figure 6B:
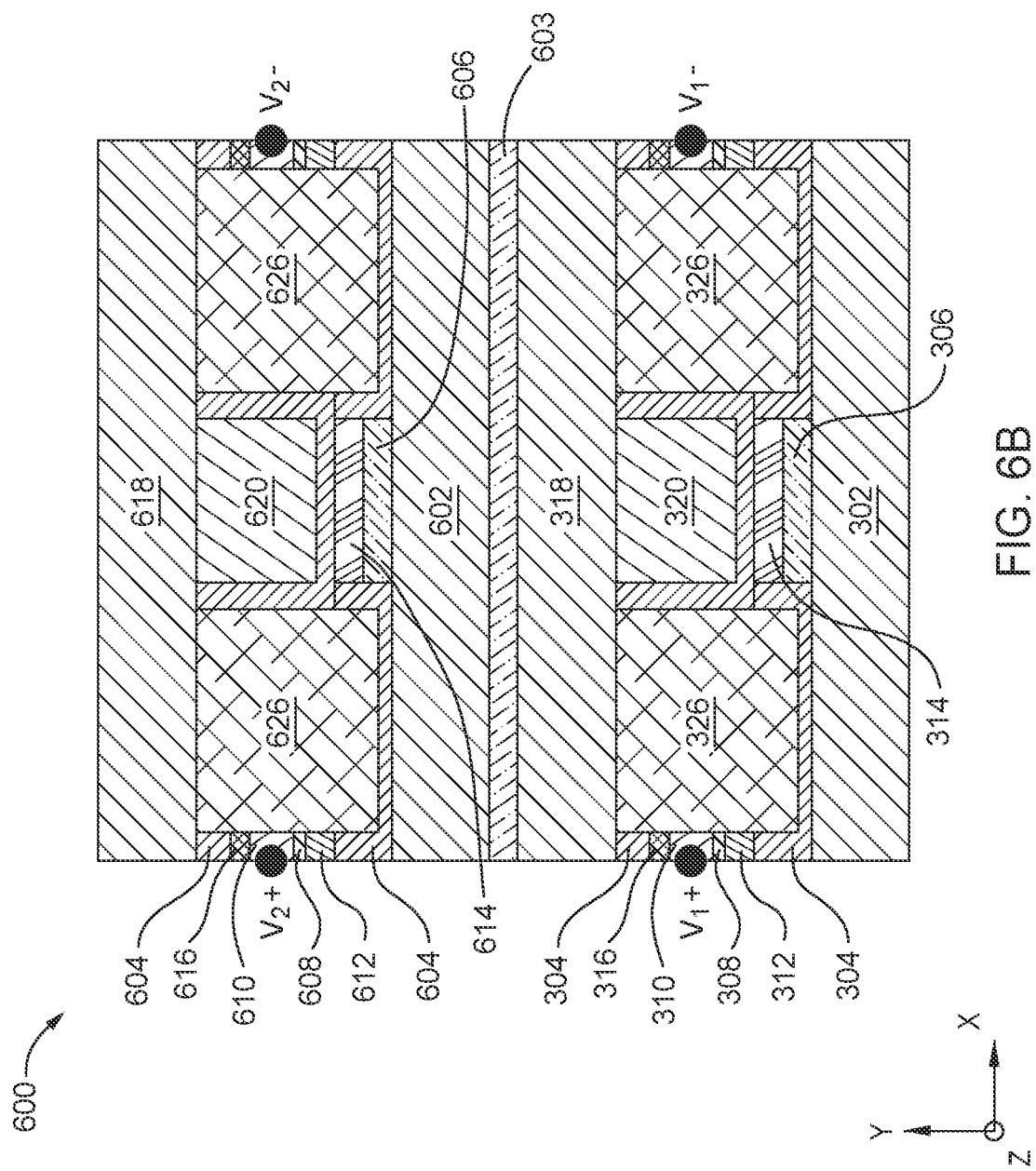

FIGS. 6A-6B illustrate various views of a SOT device 600, according to another embodiment. FIG. 6A illustrates a cross-sectional or APEX view of the SOT device 600, and FIG. 6B illustrates an MFS view of the SOT device 600. The SOT device 600 of FIGS. 6A-6B is similar to the SOT device 300 of FIGS. 3A-3B; however, the SOT device 600 is a two-dimensional magnetic recording (TDMR) SOT device 600 comprising a first SOT device 600A and a second SOT device 600B disposed on the first SOT device 600A.

The first SOT device 600A is the SOT device 300 of FIGS. 3A-3B. The second SOT device 600B is similar to the first SOT device 600A, where the second SOT device 600B comprises a first shield (S1) 602, a seed layer 606 disposed on the first shield 602, a free layer 614 disposed on the seed layer 606, a ferromagnetic (FM) layer 612 disposed on the free layer 614, an interlayer 608 disposed on the FM layer 612, a spin Hall effect (SHE) layer or BiSb layer 610 (which may also be referred to herein as a topological insulator (TI) layer) disposed on the interlayer 608, a cap layer 616 disposed on the BiSb layer 610, an insulation layer 604 disposed over the cap layer 616, and a second shield (S2) 618 disposed on the insulation layer 604. The second shield 618 further comprises a S2 notch 620 disposed at the MFS. An insulating layer 601 is disposed in contact with the S1 602 and the seed layer 606, recessed from the MFS, to help direct current towards the MFS during operation.

The insulation layer 604 is disposed between the S2 notch 620 and the free layer 614 at the MFS, and is further disposed behind the S2 notch 620 recessed from the MFS, such that the insulation layer 604 has a Z-like shape. The S2 notch 620 has a thickness in the y-direction of about 1 nm to about 5 nm. The second SOT device 600B may comprise additional layers not shown, such as a buffer layer and/or a barrier layer. The second shield 318 of the first SOT device 600A is spaced from the first shield 602 of the second SOT device 600B by an insulation layer 603.

In the TDMR SOT device 600, the FM layer 612, the interlayer 608, the SHE layer 610, and the cap layer 616 are recessed from the MFS by a portion of the insulation layer 604 and the S2 notch 620. The free layer 614 and the seed layer 606 are disposed at the MFS. The FM layer 612, the interlayer 608, the SHE layer 610, and the cap layer 616 are recessed from the MFS a distance 622 in the z-direction of about 5 nm to about 20 nm. The free layer 614 and the seed layer 606 each individually has a stripe height 624 in the z-direction of about 10 nm to about 30 nm. The distance 622 the FM layer 612, the interlayer 608, the SHE layer 610, and the cap layer 616 are recessed from the MFS is less than the stripe height 624. The FM layer 612, the interlayer 608, the SHE layer 610, and the cap layer 616 may also have a stripe height in the z-direction of about 10 nm to about 100 nm. The distance 622 may be the same as the distance 322, and the stripe height 624 may be the same as the stripe height 324.

Furthermore, due to the S2 notch 620, the shield-to-shield spacing of the second SOT device 600B is reduced at the MFS, which narrows the read gap. The shield-to-shield spacing is the distance 621 from the first shield 602 to the S2 notch 620 at the MFS, which includes the free layer 614, the seed layer 606, and the portion of the insulation layer 604 disposed at the MFS. The distance 621 is about 5 nm to about 20 nm, and may be the same as the distance 321.

The first shield 602, the second shield 618, and the S2 notch 620 may comprise the same materials as the first shield 302, the second shield 318, and the S2 notch 320. The seed layer 606 may comprise the same materials as the seed layer 306, the free layer 614 may comprise the same materials as the free layer 314, the FM layer 612 may comprise the same materials as the FM layer 312, the interlayer 608 may comprise the same materials as the interlayer 308, the BiSb layer 610 may comprise the same materials as the BiSb layer 310, and the cap layer 616 may comprise the same materials as the cap layer 316. The insulation layers 604 and 603 may comprise the same materials as the insulation layer 304.

As shown in FIG. 6B, soft bias (SB) side shields 626 are disposed on either side of the S2 notch 620, the free layer 614, and the insulation layer 604 at the MFS. The SB side shields 626 comprise a magnetic material, such as NiFe, CoFe, NiFeCo, CoFeHf, CoFeCr, or combinations thereof. The SB side shields 626 may be spaced from the free layer 614 and/or the S2 notch 620 by the insulation layer 304.

During operation, current (at the $I_1+$ lead) is applied or injected into a lead (not shown) of the S1 302 at the MFS, such as by the current source 270 of FIG. 2. The insulation layer 301 helps direct or keep the current confined near the MFS, where the current flows through the seed layer 306 to the free layer 314 at the MFS, and then flows away from the MFS in the z-direction. The current, which is spin-polarized when it comes out of the free layer 314, then flows up through the FM layer 312 and the interlayer 308 in the y-direction to the BiSb layer 310. The current then flows perpendicular in the z-direction through the BiSb layer 310, away from the MFS, to the back of the BiSb layer 310 as the current (at the $I_1-$ lead) return path (shown by arrow 650$a$ in FIG. 6A). The current then continues flowing out towards a back of the SOT device 600. Each shield may have a lead that provides a path to the current source. While flowing within the BiSb layer 310, there will be transverse voltage induced by the spin current, due to an inverse spin Hall effect, which can be sensed or detected at the cross-track locations marked $V_1+$ and $V_1-$, shown in FIG. 6B. The S2 notch 320 and the insulation layer 304 disposed between the cap layer 316 and the second shield 318 each help to confine the current path to be a Z-like shape.

Concurrently, during operation, current (at the $I_2+$ lead) is applied or injected into a lead (not shown) of the S1 602 at the MFS, such as by the current source 270 of FIG. 2. The insulation layer 601 helps direct or keep the current confined near the MFS, where the current flows through the seed layer 606 to the free layer 614 at the MFS, and then flows away from the MFS in the z-direction. The current, which is spin-polarized when it comes out of the free layer 614, then flows up through the FM layer 612 and the interlayer 608 in the y-direction to the BiSb layer 610. The current then flows perpendicular in the z-direction through the BiSb layer 610, away from the MFS, to the back of the BiSb layer 610 as the current (at the $I_2-$ lead) return path (shown by arrow 650$b$ in FIG. 6A). The current then continues flowing out towards a back of the SOT device 600. While flowing within the BiSb layer 610, there will be transverse voltage induced by the spin current, due to an inverse spin Hall effect, which can be sensed or detected at the cross-track locations marked $V_2+$ and $V_2-$, shown in FIG. 6B. The S2 notch 620 and the insulation layer 604 disposed between the cap layer 616 and the second shield 618 each help to confine the current path to be a Z-like shape.

Thus, two currents flow through the TDMR SOT device 600 during operation, a first current ($I_1$) flows through the first SOT device 600A as shown by the arrow 650$a$, and a second current ($I_2$) flows simultaneously through the second SOT device 600B as shown by the arrow 650$b$. Because the BiSb layers 310, 610 are recessed from the MFS and the free layers 314, 614 are exposed at the MFS, the BiSb layer 310 is protected from instability/corrosion due to chemical thermal/mechanical stress if exposed to the MFS and improves linear resolution.

Figure 7A:
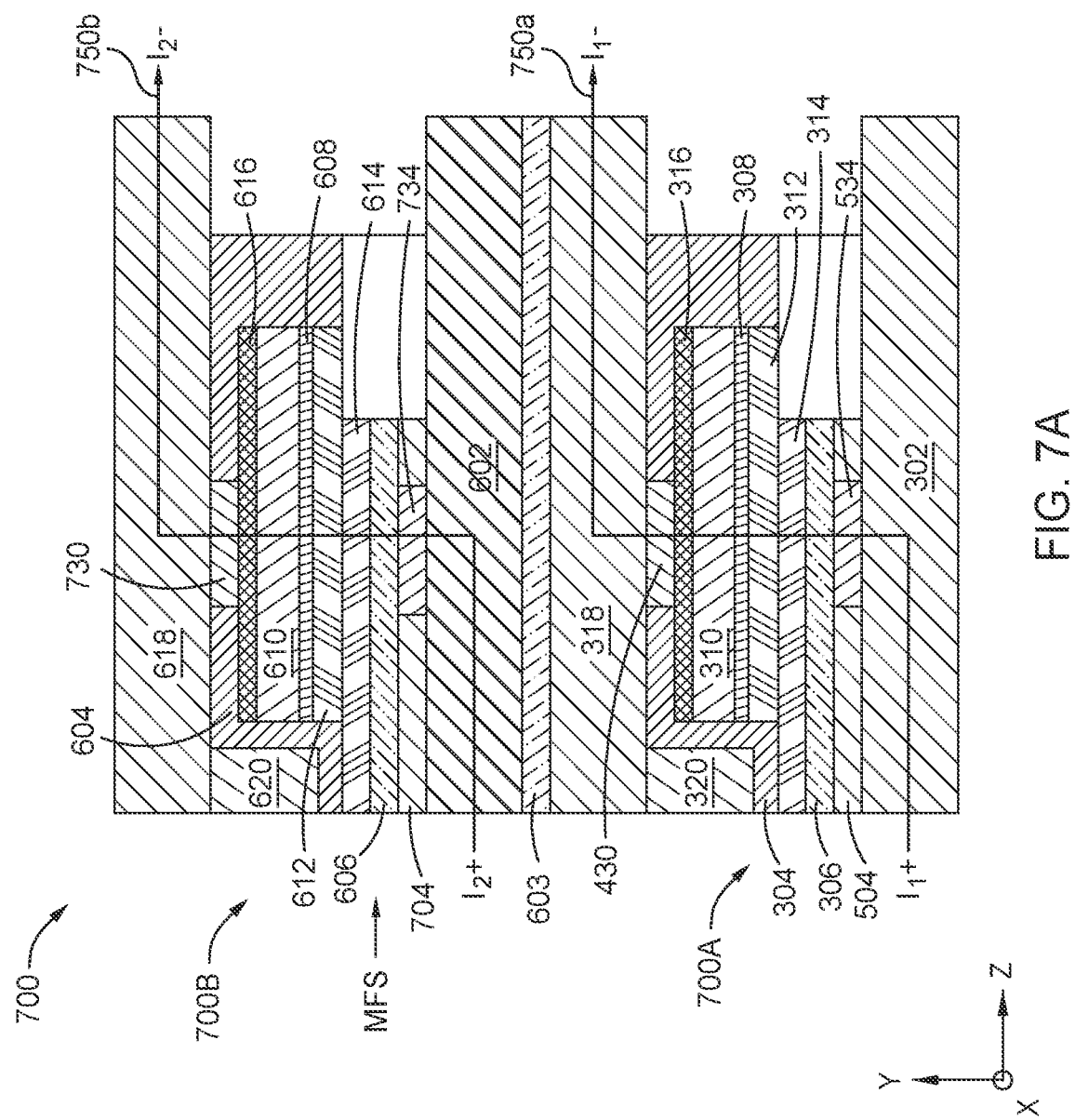
FIGS. 7A-7B illustrate various views of a TDMR SOT device, according to another embodiment.
Figure 7B:
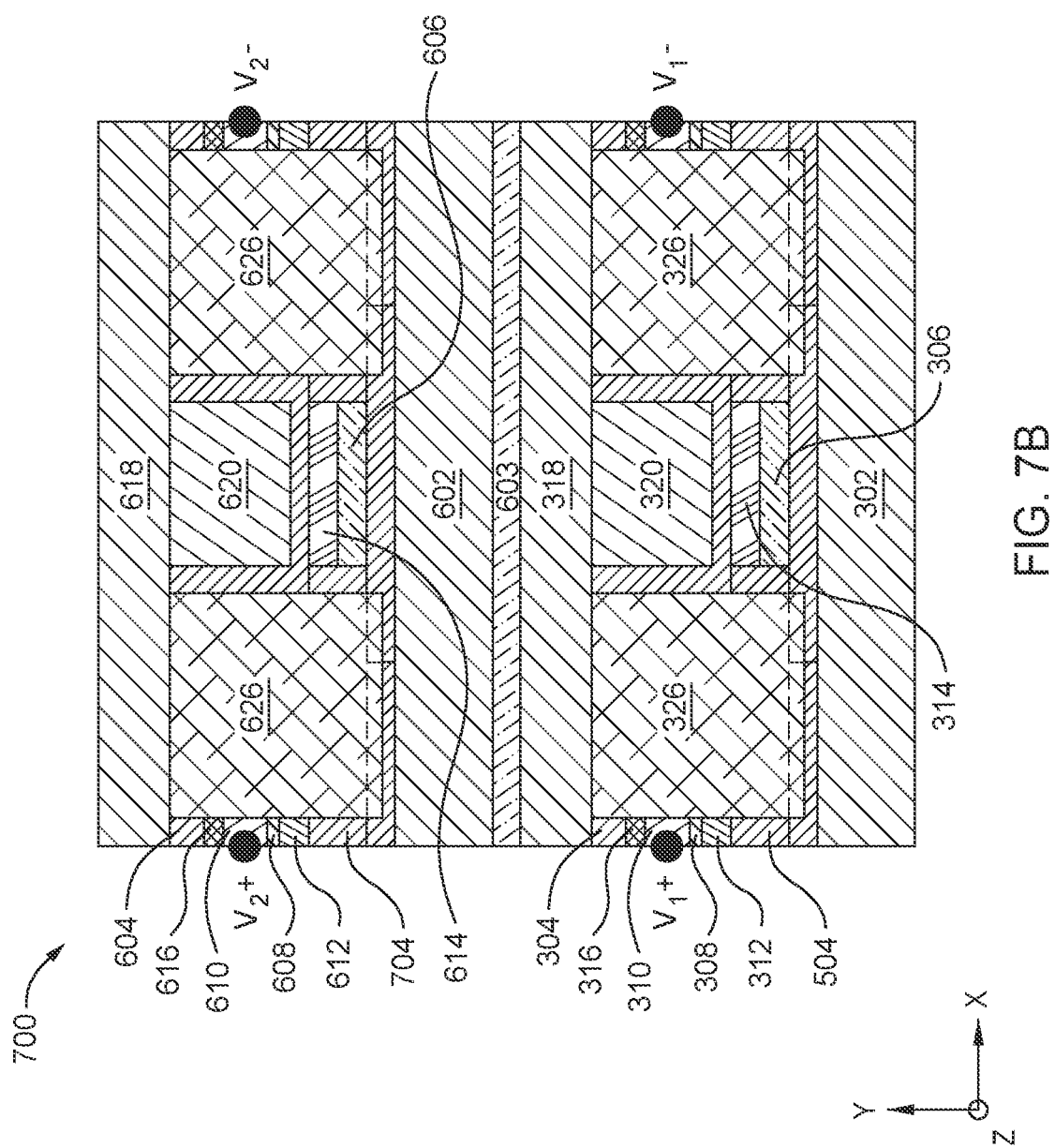

FIGS. 7A-7B illustrate various views of a TDMR SOT device 700, according to yet another embodiment. FIG. 7A illustrates a cross-sectional or APEX view of the SOT device 700, and FIG. 7B illustrates an MFS view of the TDMR SOT device 700. The SOT device 700 of FIGS. 7A-7B is similar to the TDMR SOT device 600 of FIGS. 6A-6B comprising a first SOT device 700A and a second SOT device 700B; however, the first SOT device 700A is the SOT device 500 of FIGS. 5A-5B comprising the S2 via 430 and the S1 via 534. The S1 via 534 is optional such that the first SOT device 700A may be the SOT device 400 of FIGS. 4A-4B.

The second SOT device 700B is similar to the second SOT device 600B of FIGS. 6A-6B; however, the second SOT device 700B further comprises a S2 via 730 disposed in contact with the second shield 618 and the cap layer 616, and a S1 via 734 disposed in contact with the first shield 602 and the seed layer 606. The S2 via 730 may have a width in the z-direction equal to the width 432 of the S2 via 430. The S1 via may have a width in the z-direction equal to the width 536 of the S1 via 534. The S2 via 730 may comprise the same materials as the S2 via 430, and the S1 via 734 may comprise the same materials as the S1 via 534. An insulation layer 704 is disposed between the first shield 602 and the seed layer 606, and around the S1 via 734.

During operation, current (at the $I_1+$ lead) is applied or injected into the first shield 302 at the MFS, such as by the current source 270 of FIG. 2, and flows away from the MFS in the z-direction. The current then flows perpendicularly up in the y-direction through the S1 via 534, the seed layer 306, the free layer 314, the FM layer 312, the interlayer 308, the BiSb layer 310, the cap layer 316, the S2 via 430, to the second shield 318. Each shield may have a lead that provides a path to the current source. The current then flows out through the second shield 318 in the z-direction as the current (at the $I_1-$ lead) return path (shown by arrow 750$a$ in FIG. 7A). In other words, the current flows vertically from the MFS at the first shield 302 to the second shield 318, away from the MFS. The current then continues flowing out towards a back of the SOT device 700. While flowing within the BiSb layer 310, there will be transverse voltage induced by a spin current, due to an inverse spin Hall effect, which can be sensed or detected at the cross-track locations labelled $V_1+$ and $V_1-$, shown in FIG. 7B.

Concurrently, during operation, current (at the $I_2+$ lead) is applied or injected into the free layer 614 at the MFS, such as by the current source 270 of FIG. 2, and flows away from the MFS. The current then flows perpendicularly up in the y-direction through the S1 via 734, the seed layer 606, the free layer 614, the FM layer 612, the interlayer 608, the BiSb layer 610, the cap layer 616, the S2 via 730, to the second shield 618. The current then flows out through the second shield 618 in the z-direction as the current (at the $I_2-$ lead) return path (shown by arrow 750$b$ in FIG. 7A). In other words, the current flows vertically from the MFS at the first shield 602 to the second shield 618, away from the MFS. While flowing within the BiSb layer 610, there will be transverse voltage induced by a spin current, due to an inverse spin Hall effect, which can be sensed or detected at the cross-track locations labelled $V_2+$ and $V_2-$, shown in FIG. 7B.

Thus, two currents flow through the TDMR SOT device 700 during operation, a first current ($I_1$) flows through the first SOT device 700A as shown by the arrow 750$a$, and a second current ($I_2$) flows simultaneously through the second SOT device 700B as shown by the arrow 750$b$. Because the BiSb layers 310, 610 are recessed from the MFS and the free layers 314, 614 are exposed at the MFS, the BiSb layer 310 is protected from instability/corrosion due to chemical thermal/mechanical stress if exposed to the MFS and improves linear resolution.

Figure 8A:
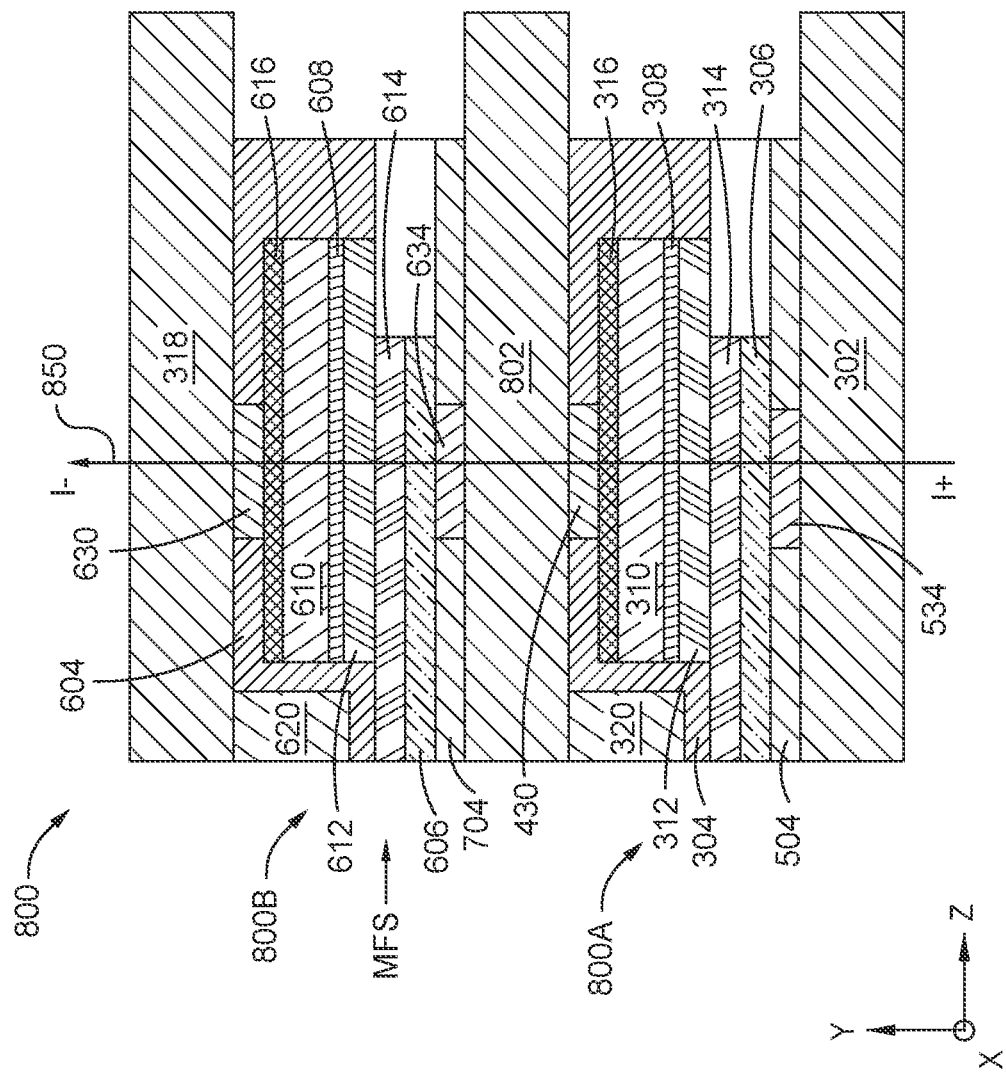
FIGS. 8A-8B illustrate various views of a TDMR SOT device, according to yet another embodiment.
Figure 8B:
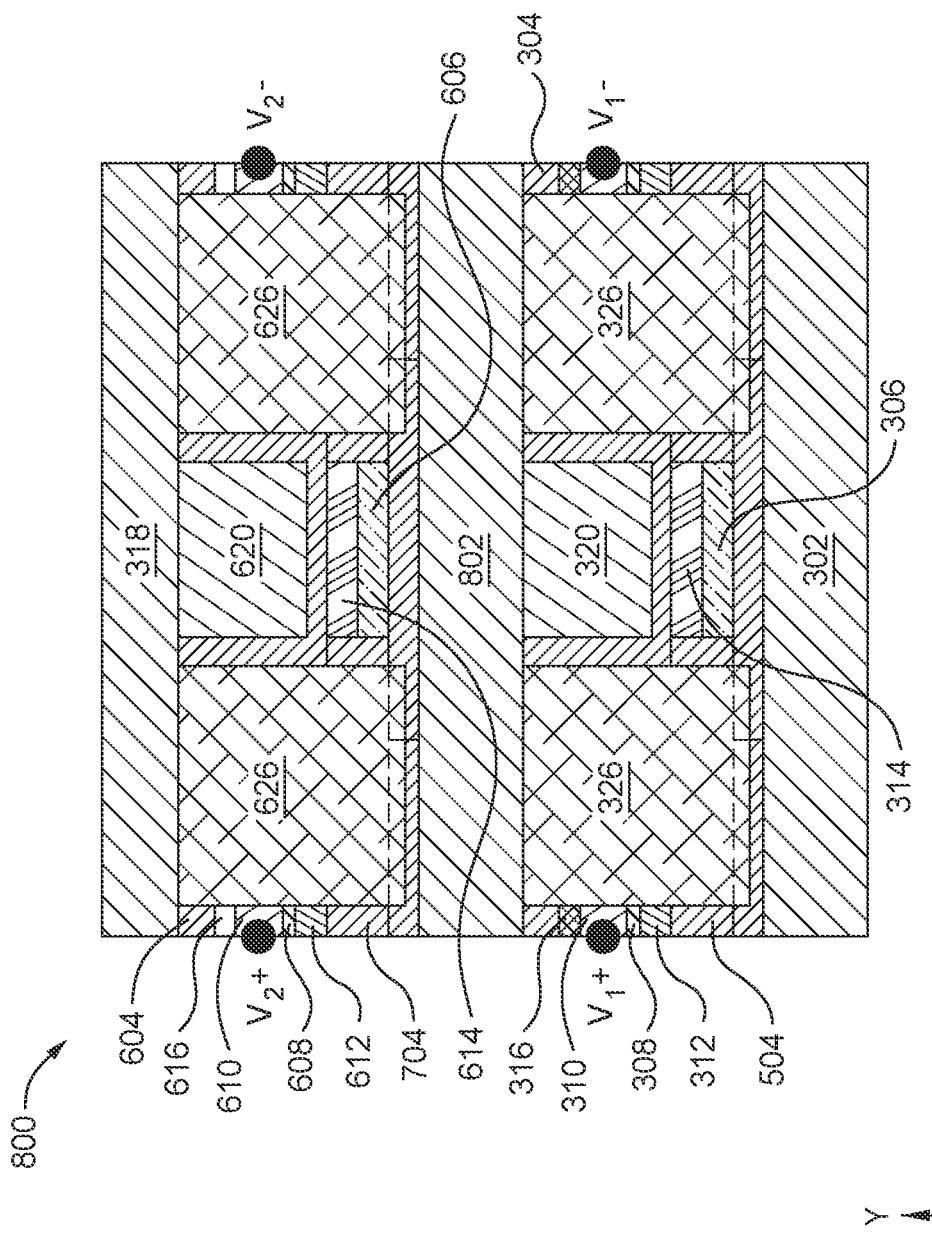

FIGS. 8A-8B illustrate various views of a TDMR SOT device 800, according to another embodiment. FIG. 8A illustrates a cross-sectional or APEX view of the SOT device 800, and FIG. 8B illustrates an MFS view of the TDMR SOT device 800. The SOT device 800 of FIGS. 8A-8B is similar to the TDMR SOT device 700 of FIGS. 7A-7B comprising a first SOT device 800A and a second SOT device 800B; however, the TDMR device 800 comprises a middle shield 802 in place of the second shield 318 and the first shield 602. As such, the TDMR SOT device 800 does not comprise the insulation layer 603. The S1 vias 534, 634 are optional.

During operation, current (at the I+ lead) is applied or injected into the first shield 302, such as by the current source 270 of FIG. 2, and flows parallel to the MFS. The current then flows perpendicularly up in the y-direction through S1 via 534, the seed layer 306, the free layer 314, the FM layer 312, the interlayer 308, the BiSb layer 310, the cap layer 316, the S2 via 430, the S1 via 634, the seed layer 606, the free layer 614, the FM layer 612, the interlayer 608, the BiSb layer 610, the cap layer 616, the S2 via 630, and out through the top of the second shield 318 as the current (at the I– lead) return path (shown by arrow 850 in FIG. 8A). In other words, the current flows vertically from the first shield 302 of the first SOT device 800A to the second shield 318 of the second SOT device 800B. The current then continues flowing out towards a back of the SOT device 800. Each shield may have a lead that provides a path to the current source.

While flowing within the BiSb layer 310 of the first SOT device 800A, there will be a first transverse voltage induced by the spin current, due to an inverse spin Hall effect, which can be sensed or detected at the cross-track locations marked $V_1+$ and $V_1-$, shown in FIG. 8B. While flowing within the BiSb layer 610 of the second SOT device 800B, there will be a second transverse voltage induced by the spin current, due to an inverse spin Hall effect, which can be sensed or detected at the cross-track locations marked $V_2+$ and $V_2-$, shown in FIG. 8B. Because the BiSb layers 310, 610 are recessed from the MFS and the free layers 314, 614 are exposed at the MFS, the BiSb layer 310 is protected from instability/corrosion due to chemical thermal/mechanical stress if exposed to the MFS and improves linear resolution.

Therefore, by having the free layer(s) and the seed layer(s) of a SOT device or a TDMR SOT device disposed at the MFS while recessing the FM layer(s), the interlayer(s), and the BiSb layer(s) away from the MFS, the shield-to-shield spacing of the SOT device is reduced, which in turn, improves down-track resolution of the read gap of the SOT device. Furthermore, because the BiSb layer(s) is recessed from the MFS, the BiSb layer(s) is protected from instability/corrosion due to chemical thermal/mechanical stress if exposed to the MFS and improves linear resolution. Moreover, by having a common middle shield, the down-track-separation (DTS) between the upper reader and the lower reader is reduced, resulting in TDMR performance at a more skewed condition, and hence improved areal density capability.

In one embodiment, a magnetic recording head comprises a first shield extending to a media facing surface (MFS), a seed layer disposed over the first shield, the seed layer being disposed at the MFS, a free layer disposed on the seed layer, the free layer being disposed at the MFS, a bismuth antimony (BiSb)-comprising layer comprising BiSb disposed over the free layer, the BiSb-comprising layer being recessed from the MFS, a second shield disposed over the BiSb layer, the second shield extending to the MFS, and a shield notch coupled to the second shield, the shield notch being disposed between the BiSb-comprising layer and the MFS and between the first shield and the second shield.

The magnetic recording head further comprises a ferromagnetic layer disposed between the free layer and the BiSb-comprising layer, the ferromagnetic layer being recessed from the MFS, an interlayer disposed between the ferromagnetic layer and the BiSb-comprising layer, the interlayer being recessed from the MFS, and an insulation layer disposed between the BiSb-comprising layer and the second shield, the insulation layer being further disposed between the shield notch and the free layer at the MFS. The magnetic recording head further comprises means for flowing a current horizontally through the free layer, vertically up to the BiSb-comprising layer, and horizontally out through the BiSb-comprising layer, with the horizontal direction being perpendicular to the MFS and the vertical direction being parallel to the MFS.

The magnetic recording head further comprises a first via coupled to the second shield, the first via being disposed between the BiSb-comprising layer and the second shield. The magnetic recording head further comprises means for flowing a current horizontally through the free layer, and vertically up through the BiSb-comprising layer, and the first via, with the horizontal direction being perpendicular to the MFS and the vertical direction being parallel to the MFS. The magnetic recording head further comprises a second via coupled to the first shield, the second via being disposed between the free layer and the first shield. The magnetic recording head further comprises means for flowing a current vertically through the first shield, the second via, the free layer, the BiSb-comprising layer, and the first via, with the horizontal direction being perpendicular to the MFS and the vertical direction being parallel to the MFS. A magnetic recording device comprises the magnetic recording head.

In another embodiment, a magnetic recording head comprises a first shield extending to a media facing surface (MFS), a first free layer disposed over the first shield, the first free layer being disposed at the MFS, a first bismuth antimony (BiSb)-comprising layer comprising BiSb disposed over the first free layer, the first BiSb-comprising layer being recessed from the MFS, a second shield disposed over the first BiSb-comprising layer, the second shield extending to the MFS, a first shield notch coupled to the second shield, the first shield notch being disposed between the first BiSb-comprising layer and the MFS and between the first shield and the second shield, wherein the first BiSb-comprising layer is recessed from the MFS by the first shield notch, a third shield extending to the MFS, the third shield being disposed over the second shield, a second free layer disposed over the third shield, the second free layer being disposed at the MFS, a second BiSb-comprising layer comprising BiSb disposed over the second free layer, the second BiSb-comprising layer being recessed from the MFS, a fourth shield disposed over the second BiSb-comprising layer, the fourth shield extending to the MFS, and a second shield notch coupled to the fourth shield, the second shield notch being disposed between the second BiSb-comprising layer and the MFS and between the third shield and the fourth shield, wherein the second BiSb-comprising layer is recessed from the MFS by the second shield notch.

The magnetic recording head further comprises means for flowing a first current horizontally through the first free layer, vertically up to the first BiSb-comprising layer, and horizontally out through the first BiSb-comprising layer, and means for flowing a second current horizontally through the second free layer, and vertically up to second first BiSb-comprising layer, with the horizontal direction being perpendicular to the MFS and the vertical direction being parallel to the MFS. The magnetic recording head further comprises a first via coupled to the second shield, the first via being disposed between the first BiSb-comprising layer and the second shield, wherein the first via is recessed from the MFS, and a second via coupled to the fourth shield, the second via being disposed between the second free layer and the fourth shield, wherein the second via is recessed from the MFS. The magnetic recording head further comprises means for flowing a first current horizontally through the first shield, and vertically up through the first free layer, the first BiSb-comprising layer, and the first via, and means for flowing a second current horizontally through the third shield, and vertically up through the second free layer, the second BiSb-comprising layer, and the second via, with the horizontal direction being perpendicular to the MFS and the vertical direction being parallel to the MFS.

The magnetic recording head further comprises a third via coupled to the first shield, the third via being disposed between the first free layer and the first shield, wherein the third via is recessed from the MFS, and a fourth via coupled to the third shield, the fourth via being disposed between the second free layer and the third shield, wherein the fourth via is recessed from the MFS. The magnetic recording head further comprises a first ferromagnetic layer disposed between the first free layer and the first BiSb-comprising layer, the first ferromagnetic layer being recessed from the MFS, a first interlayer disposed between the first ferromagnetic layer and the first BiSb-comprising layer, the first interlayer being recessed from the MFS, a first insulation layer disposed between the first BiSb-comprising layer and the second shield, the first insulation layer being further disposed between the first shield notch and the first free layer at the MFS, a second ferromagnetic layer disposed between the second free layer and the second BiSb-comprising layer, the second ferromagnetic layer being recessed from the MFS, a second interlayer disposed between the second ferromagnetic layer and the second BiSb-comprising layer, the second interlayer being recessed from the MFS, and a second insulation layer disposed between the second BiSb-comprising layer and the fourth shield, the second insulation layer being further disposed between the second shield notch and the second free layer at the MFS. A magnetic recording device comprises the magnetic recording head.

In yet another embodiment, a magnetic recording head comprises a first shield extending to a media facing surface (MFS), a first free layer disposed over the first shield, the first free layer being disposed at the MFS, a bismuth antimony (BiSb)-comprising layer comprising BiSb disposed over the first free layer, the first BiSb-comprising layer being recessed from the MFS, a second shield disposed over the first BiSb-comprising layer, the second shield extending to the MFS, a first shield notch coupled to the second shield, the first shield notch being disposed between the first BiSb-comprising layer and the MFS and between the first shield and the second shield, wherein the first BiSb-comprising layer is recessed from the MFS by the first shield notch, a second free layer disposed over the second shield, the second free layer being disposed at the MFS, a second BiSb-comprising layer comprising BiSb disposed over the second free layer, the second BiSb-comprising layer being recessed from the MFS, a third shield disposed over the second BiSb-comprising layer, the third shield extending to the MFS, and a second shield notch coupled to the third shield, the second shield notch being disposed between the second BiSb-comprising layer and the MFS and between the second shield and the third shield, wherein the second BiSb-comprising layer is recessed from the MFS by the second shield notch.

The magnetic recording head further comprises means for flowing a current vertically through the first shield, the first free layer, the first BiSb-comprising layer, the second shield, the second free layer, and the second BiSb-comprising layer, with a horizontal direction being perpendicular to the MFS and the vertical direction being parallel to the MFS. The magnetic recording head further comprises a first via coupled to the second shield adjacent to the first BiSb-comprising layer, the first via being recessed from the MFS, and a second via coupled to the third shield, the second via being recessed from the MFS. The magnetic recording head further comprises a third via coupled to the first shield, the third via being recessed from the MFS, and a fourth via coupled to the second shield adjacent to the second free layer, the fourth via being recessed from the MFS. The magnetic recording head further comprises a first seed layer disposed between the first free layer and the first shield, a first ferromagnetic layer disposed between the first free layer and the first BiSb-comprising layer, the first ferromagnetic layer being recessed from the MFS, a first interlayer disposed between the first ferromagnetic layer and the first BiSb-comprising layer, the first interlayer being recessed from the MFS, a first cap layer disposed between the first BiSb-comprising layer and the second shield, a first insulation layer disposed between the first cap layer and the second shield, the first insulation layer being further disposed between the first shield notch and the first free layer at the MFS, a second seed layer disposed between the second free layer and the second shield, a second ferromagnetic layer disposed between the second free layer and the second BiSb-comprising layer, the second ferromagnetic layer being recessed from the MFS, a second interlayer disposed between the second ferromagnetic layer and the second BiSb-comprising layer, the second interlayer being recessed from the MFS, a second cap layer disposed between the second BiSb-comprising layer and the third shield, and a second insulation layer disposed between the second cap layer and the third shield, the second insulation layer being further disposed between the second shield notch and the second free layer at the MFS. A magnetic recording device comprises the magnetic recording head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
    a first shield extending to a media facing surface (MFS);
    a seed layer disposed over the first shield, the seed layer being disposed at the MFS;
    a free layer disposed on the seed layer, the free layer being disposed at the MFS;
    a bismuth antimony (BiSb)-comprising layer comprising BiSb disposed over the free layer, the BiSb-comprising layer being recessed from the MFS;
    a ferromagnetic layer disposed between the free layer and the BiSb-comprising layer;
    a second shield disposed over the BiSb-comprising layer, the second shield extending to the MFS; and
    a shield notch coupled to the second shield, the shield notch being disposed between the BiSb-comprising layer and the MFS and between the first shield and the second shield.

2. The magnetic recording head of claim 1, further comprising:
  an interlayer disposed between the free layer and the BiSb-comprising layer, the interlayer being recessed from the MFS; and
  an insulation layer disposed between the BiSb-comprising layer and the second shield, the insulation layer being further disposed between the shield notch and the free layer at the MFS.

3. The magnetic recording head of claim 2,
  wherein the ferromagnetic layer is recessed from the MFS.

4. The magnetic recording head of claim 1, further comprising means for flowing a current horizontally through the free layer, vertically up to the BiSb-comprising layer, and horizontally out through the BiSb-comprising layer, with a horizontal direction being perpendicular to the MFS and a vertical direction being parallel to the MFS.

5. The magnetic recording head of claim 1, further comprising:
  a first via coupled to the second shield, the first via being disposed between the BiSb-comprising layer and the second shield.

6. The magnetic recording head of claim 5, further comprising means for flowing a current horizontally through the free layer, and vertically up through the BiSb-comprising layer, and the first via, with a horizontal direction being perpendicular to the MFS and a vertical direction being parallel to the MFS.

7. The magnetic recording head of claim 5, further comprising a second via coupled to the first shield, the second via being disposed between the free layer and the first shield.

8. The magnetic recording head of claim 6, further comprising means for flowing a current vertically through the first shield, the second via, the free layer, the BiSb-comprising layer, and the first via, with a horizontal direction being perpendicular to the MFS and a vertical direction being parallel to the MFS.

9. A magnetic recording device comprising the magnetic recording head of claim 1.

10. A magnetic recording head, comprising:
  a first shield extending to a media facing surface (MFS);
  a first free layer disposed over the first shield, the first free layer being disposed at the MFS;
  a first bismuth antimony (BiSb)-comprising layer comprising BiSb disposed over the first free layer, the first BiSb-comprising layer being recessed from the MFS;
  a second shield disposed over the first BiSb-comprising layer, the second shield extending to the MFS;
  a first shield notch coupled to the second shield, the first shield notch being disposed between the first shield and the second shield, wherein the first BiSb-comprising layer is recessed from the MFS by the first shield notch;
  a third shield extending to the MFS, the third shield being disposed over the second shield;
  a second free layer disposed over the third shield, the second free layer being disposed at the MFS;
  a second BiSb-comprising layer comprising BiSb disposed over the second free layer, the second BiSb-comprising layer being recessed from the MFS;
  a fourth shield disposed over the second BiSb-comprising layer, the fourth shield extending to the MFS; and
  a second shield notch coupled to the fourth shield, the second shield notch being disposed between the third shield and the fourth shield, wherein the second BiSb-comprising layer is recessed from the MFS by the second shield notch.

11. The magnetic recording head of claim 10, further comprising:
  means for flowing a first current horizontally through the first free layer, vertically up to the first BiSb-comprising layer, and horizontally out through the first BiSb-comprising layer, with a horizontal direction being perpendicular to the MFS and a vertical direction being parallel to the MFS; and
  means for flowing a second current horizontally through the second free layer, vertically up to the second BiSb-comprising layer, and horizontally out through the second BiSb-comprising layer.

12. The magnetic recording head of claim 10, further comprising:
  a first via coupled to the second shield, the first via being disposed between the first BiSb-comprising layer and the second shield, wherein the first via is recessed from the MFS;
  a second via coupled to the fourth shield, the second via being disposed between the second free layer and the fourth shield, wherein the second via is recessed from the MFS.

13. The magnetic recording head of claim 12, further comprising:
  means for flowing a first current horizontally through the first shield, and vertically up through the first free layer, the first BiSb-comprising layer, and the first via, with a horizontal direction being perpendicular to the MFS and a vertical direction being parallel to the MFS; and
  means for flowing a second current horizontally through the third shield, and vertically up through the second free layer, the second BiSb-comprising layer, and the second via.

14. The magnetic recording head of claim 12, further comprising:
  a third via coupled to the first shield, the third via being disposed between the first free layer and the first shield, wherein the third via is recessed from the MFS; and
  a fourth via coupled to the third shield, the fourth via being disposed between the second free layer and the third shield, wherein the fourth via is recessed from the MFS.

15. The magnetic recording head of claim 10, further comprising:
  a first ferromagnetic layer disposed between the first free layer and the first BiSb-comprising layer, the first ferromagnetic layer being recessed from the MFS;
  a first interlayer disposed between the first ferromagnetic layer and the first BiSb-comprising layer, the first interlayer being recessed from the MFS;
  a first insulation layer disposed between the first BiSb-comprising layer and the second shield, the first insulation layer being further disposed between the first shield notch and the first free layer at the MFS;
  a second ferromagnetic layer disposed between the second free layer and the second BiSb-comprising layer, the second ferromagnetic layer being recessed from the MFS;
  a second interlayer disposed between the second ferromagnetic layer and the second BiSb-comprising layer, the second interlayer being recessed from the MFS; and
  a second insulation layer disposed between the second BiSb-comprising layer and the fourth shield, the second insulation layer being further disposed between the second shield notch and the second free layer at the MFS.

16. A magnetic recording device comprising the magnetic recording head of claim 10.

17. A magnetic recording head, comprising:
a first shield extending to a media facing surface (MFS);
a first free layer disposed over the first shield, the first free layer being disposed at the MFS;
a first bismuth antimony (BiSb)-comprising layer comprising BiSb disposed over the first free layer, the first BiSb-comprising layer being recessed from the MFS;
a second shield disposed over the first BiSb-comprising layer, the second shield extending to the MFS;
a first shield notch coupled to the second shield, the first shield notch being disposed between the first shield and the second shield, wherein the first BiSb-comprising layer is recessed from the MFS by the first shield notch;
a second free layer disposed over the second shield, the second free layer being disposed at the MFS;
a second BiSb-comprising layer comprising BiSb disposed over the second free layer, the second BiSb-comprising layer being recessed from the MFS;
a third shield disposed over the second BiSb-comprising layer, the third shield extending to the MFS; and
a second shield notch coupled to the third shield, the second shield notch being disposed between the second shield and the third shield, wherein the second BiSb-comprising layer is recessed from the MFS by the second shield notch.

18. The magnetic recording head of claim 17, further comprising means for flowing a current vertically through the first shield, the first free layer, the first BiSb-comprising layer, the second shield, the second free layer, and the second BiSb-comprising layer, with a horizontal direction being perpendicular to the MFS and a vertical direction being parallel to the MFS.

19. The magnetic recording head of claim 17, further comprising:
a first via coupled to the second shield adjacent to the first BiSb-comprising layer, the first via being recessed from the MFS; and
a second via coupled to the third shield, the second via being recessed from the MFS.

20. The magnetic recording head of claim 19, further comprising:
a third via coupled to the first shield, the third via being recessed from the MFS; and
a fourth via coupled to the second shield adjacent to the second free layer, the fourth via being recessed from the MFS.

21. The magnetic recording head of claim 17, further comprising:
a first seed layer disposed between the first free layer and the first shield;
a first ferromagnetic layer disposed between the first free layer and the first BiSb-comprising layer, the first ferromagnetic layer being recessed from the MFS;
a first interlayer disposed between the first ferromagnetic layer and the first BiSb-comprising layer, the first interlayer being recessed from the MFS;
a first cap layer disposed between the first BiSb-comprising layer and the second shield;
a first insulation layer disposed between the first cap layer and the second shield, the first insulation layer being further disposed between the first shield notch and the first free layer at the MFS;
a second seed layer disposed between the second free layer and the second shield;
a second ferromagnetic layer disposed between the second free layer and the second BiSb-comprising layer, the second ferromagnetic layer being recessed from the MFS;
a second interlayer disposed between the second ferromagnetic layer and the second BiSb-comprising layer, the second interlayer being recessed from the MFS;
a second cap layer disposed between the second BiSb-comprising layer and the third shield; and
a second insulation layer disposed between the second cap layer and the third shield, the second insulation layer being further disposed between the second shield notch and the second free layer at the MFS.

22. A magnetic recording device comprising the magnetic recording head of claim 17.

* * * * *